US012735945B2

(12) United States Patent
Johnson

(10) Patent No.: US 12,735,945 B2
(45) Date of Patent: Sep. 15, 2026

(54) ATTIC SAFETY PLATFORM

(71) Applicant: Brett Thomas Johnson, Provo, UT (US)

(72) Inventor: Brett Thomas Johnson, Provo, UT (US)

( * ) Notice: Subject to any disclaimer, the term of this patent is extended or adjusted under 35 U.S.C. 154(b) by 0 days.

(21) Appl. No.: 19/046,305

(22) Filed: Feb. 5, 2025

(65) Prior Publication Data

US 2026/0071495 A1 Mar. 12, 2026

Related U.S. Application Data

(60) Provisional application No. 63/692,020, filed on Sep. 6, 2024.

(51) Int. Cl.
*E06C 7/46* (2006.01)
*E04G 3/26* (2006.01)

(52) U.S. Cl.
CPC . *E06C 7/46* (2013.01); *E04G 3/26* (2013.01)

(58) Field of Classification Search
CPC ..... E06C 7/42; E06C 7/46; E04G 3/26; E04G 5/041; A47C 16/04; B25H 3/06
See application file for complete search history.

(56) References Cited

U.S. PATENT DOCUMENTS 4,490,956 A * 1/1985 Palacio ..................... E04C 3/02 52/696
5,148,890 A * 9/1992 Sipe .......................... E04G 3/26 52/749.1
5,771,992 A * 6/1998 Snyder .................... E06C 7/426 182/45
5,791,438 A * 8/1998 Kempton ................ E06C 7/426 182/45
7,328,772 B2 * 2/2008 Gardner .................... E06C 7/44 182/172
8,015,761 B2 * 9/2011 Wainland ............... A47B 96/02 52/177
8,096,087 B2 * 1/2012 Wainland .................. E04B 5/12 52/177
8,567,560 B1 * 10/2013 Rodriguez .............. E04G 5/041 182/223
10,815,729 B2 * 10/2020 Bowling ................. E06C 7/188
2007/0028550 A1 * 2/2007 Clapper .................... E04G 3/26 52/650.3
2009/0090279 A1 * 4/2009 Wainland .............. F16B 5/0216 108/42
2009/0200110 A1 * 8/2009 Esselborn ................. E06C 7/46 182/107
2013/0031846 A1 * 2/2013 Shaw ................ E04F 15/02183 52/741.3

(Continued)

FOREIGN PATENT DOCUMENTS

WO WO-2017139722 A1 * 8/2017 ............... E06C 7/46

*Primary Examiner* — Colleen M Chavchavadze
(74) *Attorney, Agent, or Firm* — Kunzler Needham Hilton; Bryan Pitt

(57) ABSTRACT

Disclosed herein is a safety platform for use in an attic or similar space. The safety platform may include a base; a set of truss brackets coupled to the base; and a set of truss securement mechanisms configured to removably attach the set of truss brackets to one or more trusses or joists. In some examples, each truss bracket may include a truss securement mechanism.

20 Claims, 16 Drawing Sheets

(56) References Cited

U.S. PATENT DOCUMENTS

| | | | | |
|---|---|---|---|---|
| 2013/0119213 | A1* | 5/2013 | Watson | E06C 7/42<br>248/201 |
| 2014/0116804 | A1* | 5/2014 | Bancroft | E06C 1/345<br>182/45 |
| 2016/0265238 | A1* | 9/2016 | Brinkman | E04G 3/265 |

* cited by examiner

ATTIC SAFETY PLATFORM

CROSS-REFERENCE TO RELATED APPLICATIONS

This application claims priority to U.S. Provisional Patent Application Ser. No. 63/692,020 entitled "ATTIC SAFETY PLATFORM" and filed on Sep. 6, 2024, for Brett Thomas Johnson, which is incorporated herein by reference in its entirety.

FIELD

This invention relates to safety platforms and more particularly relates to safety platforms for work in an attic, or similar enclosed spaces.

BACKGROUND

When working in an attic, a tradesperson, such as a carpenter, electrician, general contractor, home inspector, HVAC (Heating, Ventilation, and Air Conditioning) technician, insulation installer, pest control technician, plumber, roofer, contractor, handyman, repairperson, security system installer, or solar panel installer—may need to use a ladder when performing their work. However, attics often have limited headroom and uneven surfaces, making it easy to lose balance. Additionally, the confined space of an attic can make maneuvering difficult, increasing the risk of bumping into objects or misplacing the ladder. Using a ladder incorrectly, such as placing it on an unstable or uneven surface, increases the risk of falling.

SUMMARY

An apparatus for an attic safety platform is disclosed. A system and method also perform the functions of the apparatus.

A safety platform is described. The safety platform may include a base; a set of one or more truss brackets coupled to the base; and a set of one or more truss securement mechanisms configured to secure (e.g., removably attach) the set of truss brackets to one or more trusses or joists. In some examples, each truss bracket may include a truss securement mechanism. As used herein, securing a truss bracket a truss or joist refers to attaching the truss bracket (and therefore the safety platform) to the truss or joist in a secure and removable manner. In this way, the safety platform will not slip or fall from the truss or joist while the tradesperson is performing work in the attic space (or similar environment with limited space and/or uneven surface) and the tradesperson is able to remove the safety platform from the work area after completing the work.

In some implementations, the truss securement mechanism of the safety platform may include one or more of: A) a threaded spike; B) a vice; C) a quick release clamp; or D) a combination thereof.

In some implementations, the base of the safety platform may include a padded perimeter. In some implementations, the base of the safety platform may include a raised lip along a perimeter of an upper surface of the base, where the set of truss brackets is coupled to a bottom surface of the base.

In some implementations, the set of truss brackets may be configured to rotate relative to the base to adjust the safety platform based on an environment above the one or more trusses or joists. In certain implementations, the set of truss brackets is configured to rotate between 0 and 90 degrees about an axis perpendicular to a plane associated with the base.

In some implementations, one or more truss brackets of the set of truss brackets may be configured to adjust linearly based on a spacing between the one or more trusses or joists.

In some implementations, the base may include an interlocking edge for attaching to a matching edge of a second safety platform. In certain implementations, the interlocking edge forms a first portion of a hinge, and the matching edge forms a second portion of hinge. In such implementations, the safety platform and the second safety platform may be rotatable relative to each other about an axis formed by the hinge.

In some implementations, the safety platform additionally includes an embedded nut for receiving a bolt through a second safety platform and a captured bolt for inserting into a matching nut of the second safety platform. In some implementations, an upper surface of the base comprises a sunken area configured to receive a ladder, and wherein at least the sunken area comprises an anti-slip coating.

A ladder safety system for selectively receiving a ladder is described. The ladder may have a pair of spaced legs, a pair of feet corresponding to the pair of spaced legs, and a plurality of spaced transversely mounted rungs. The ladder safety system may include a support platform comprising an upper surface, an opposed bottom surface, and a perimeter.

The ladder safety system may include at least two truss brackets coupled to the bottom surface of the support platform, where each truss bracket includes: a base member extending horizontally along the opposed bottom surface of the support platform; a side member extending downwardly away from bottom surface of the support platform; and a truss securement mechanism configured to secure the truss bracket to a truss or a joist. The base member and the side member of each truss bracket may define a partially open trough that is configured to receive the truss or joist. Each securement mechanism may be configured to secure a corresponding truss bracket to a different truss or joist of a set of trusses or a joists.

In some implementations, the upper surface of the support platform comprises a sunken area configured to receive the pair of feet, and wherein at least the sunken area comprises an anti-slip coating. In some implementations, the truss securement mechanism may include one or more of: A) a threaded spike; B) a vice; C) a quick release clamp; or D) a combination thereof.

In some implementations, the ladder safety system additionally includes a raised lip along the perimeter of the support platform. In some implementations, the perimeter of the support platform may be padded.

In some implementations, each truss bracket is configured to rotate relative to the support platform for adapting an orientation of the support platform based on the location of the set of trusses or joists. In certain implementations, each truss bracket is configured to rotate about an axis perpendicular to the support platform.

In some implementations, at least one truss bracket is coupled to the bottom surface of the support platform via a track, and wherein the at least one truss bracket is linearly adjustable relative to the remainder of the at least two truss brackets based on a spacing between the set of trusses or joists.

In some implementations, the support platform may include a first portion and a second portion, wherein the first portion comprises an interlocking edge for attaching to a matching edge of the second portion. In certain implementations, the interlocking edge forms a first portion of a hinge, and the matching edge forms a second portion of hinge, wherein the first portion and the second portion may rotate relative to each other about an axis formed by the hinge.

One method of use for the attic safety platform is to affix to one or more trusses or joists and provide support or a stable platform for a ladder above the trusses or joists. An alternative method is a affix to one or more trusses or joists and provide a stable platform for a user to sit, stand, or lay upon to reach areas within the attic while on the safety platform. Another alternative method of use includes at least two safety platforms secured to trusses where a ladder is centered across an opening of the at least two safety platforms.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

An attic safety platform 100 provides a stable surface to rest the feet of a ladder or to serve as secure working area for an individual while sitting, standing, and/or working in an attic or above a set of trusses or joists. In some embodiments, the attic safety platform 100 is usable within an attic space of a residential structure or similar building having trusses or joists spaced at regular intervals. In some implementations, the attic safety platform 100 includes adjustable brackets to accommodate trusses or joists spaced at different (e.g., irregular) intervals and/or to adapt to different spacing between adjacent trusses or joists.

Figure 1:
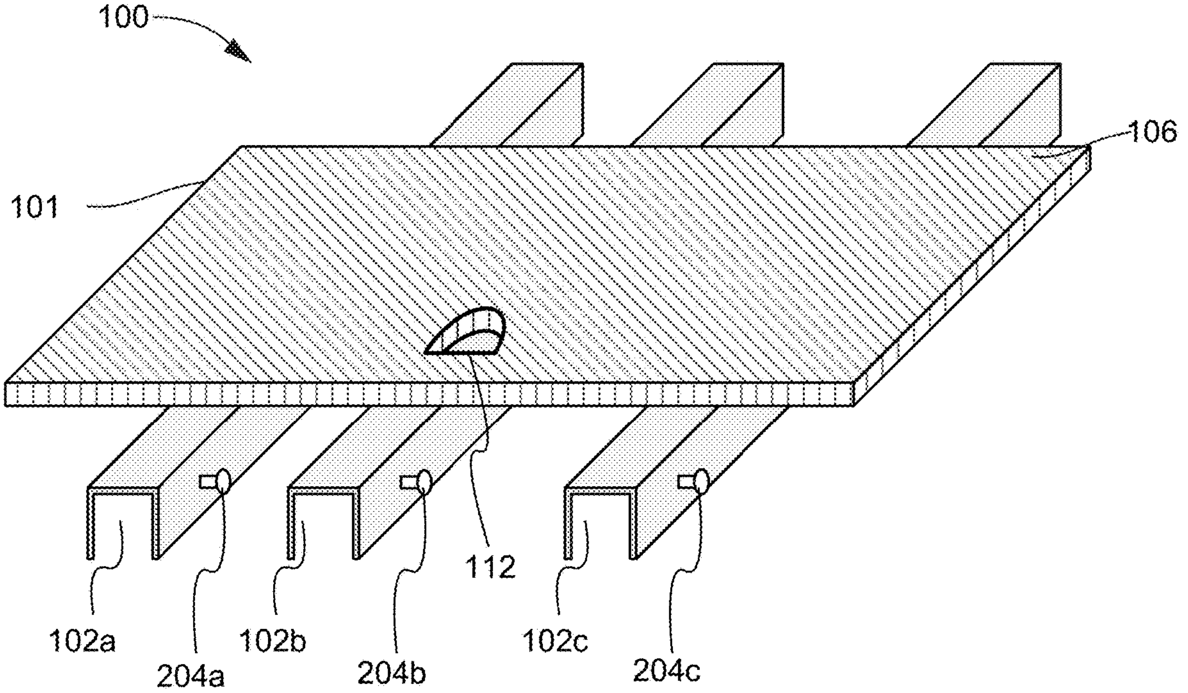
FIG. 1 is a perspective view illustrating one embodiment of an attic safety platform in accordance with aspects of the present disclosure.

As depicted in FIG. 1, an attic safety platform 100 includes a platform base 101 and one or more truss brackets 102*a-c* and corresponding truss securement mechanisms 104*a-c*, as shown in FIG. 1.

In various embodiments, the attic safety platform 100 is dimensioned to allow for the attic safety platform 100 to fit through most standard attic openings with ease while being large enough to support a ladder or user in an attic space. In some embodiments, the attic safety platform 100 is 36 inches in length and 24 inches in width. In another embodiment, the attic safety platform 100 is 36 inches in length and 18 inches in width. In yet another embodiment, the attic safety platform 100 may be 40 inches in length and 24 inches in width. In certain embodiments, the platform base 101 may be approximately ⅜ inches thick.

In various embodiments, the platform base 101 includes a top layer 106. In alternate embodiments, the top layer 106 may be a textured area of the platform base 101. For example, a texture may be applied to an upper surface of the platform base 101 to form the top layer 106.

In some embodiments, platform base 101 includes a handle 112. In one embodiment, the handle 112 is a cutout of the top surface of the platform base 101 to allow a user to grasp and carry the attic safety platform 100. In another embodiment, the handle 112 extends outward from the platform base 101. In some embodiments, the handle 112 may be a rubber coated section on the underside of the base. In such an embodiment, the handle 112 is out of the way when the attic safety platform 100 is in use above attic trusses or joists. Alternatively, the handle 112 is secured to the underside of the platform base 101.

In the example of FIG. 1, the attic safety platform 100 may include at least two truss brackets 102 for affixing the safety platform to at least two trusses or joists. In one embodiment, the truss brackets 102 are singular, solid U-shaped brackets sized to fit over a truss. For example, each truss bracket 102 may have a symmetric solid U-shape with inner dimensions 1.5 inches tall and 2.5 inches opening to go over a truss. In some embodiments, the U-shape is asymmetric with the sides having different dimensions.

In another embodiment, the truss brackets 102 may include an L-shaped bracket sized to surround two sides a truss. In such embodiments, one L-shaped truss bracket 102 may be positioned to attach to a left side of a truss (i.e., when viewed in cross section) while another L-shaped truss bracket 102 may be positioned to attach to a right side of a different truss.

The truss brackets 102 may be a variety of materials such as steel, plastic, or wood. In some embodiments, the truss brackets 102 extend beyond the platform base 101. In other embodiments, the truss brackets 102 are the same length as the width of the platform base 101 to easily fit within the attic opening. In yet other embodiments, rather than having a unitary truss bracket 102 extending from one side of the platform base 101 to the opposite side, there may be a pair of truss brackets 102 in line with each other and configured to attach to the same truss. In such embodiments, the attic safety platform 100 may include two or more pairs of truss brackets 102, each pair configured to attach to a different truss.

In the depicted embodiment, the attic safety platform 100 includes a plurality of truss brackets 102*a-c*, each having a truss securement mechanisms 104*a-c*, i.e., at least a first truss securement mechanism 104*a* affixed to the first truss bracket 102*a*, a second truss securement mechanism 104*b* affixed to the second truss bracket 102*b*, and a third truss securement mechanism 104*c* affixed to the third truss bracket 102*c*. In the depicted embodiment the truss securement mechanisms 104 are located on a side of the truss brackets 102, and securely attach the attic safety platform 100 to the side of a truss or joist. Various implementations of the truss securement mechanisms 104 are described below. While FIG. 1 shows each truss bracket 102 having a truss securement mechanisms 104, in other embodiments, only one truss bracket 102 includes a truss securement mechanism 104.

Figure 2:
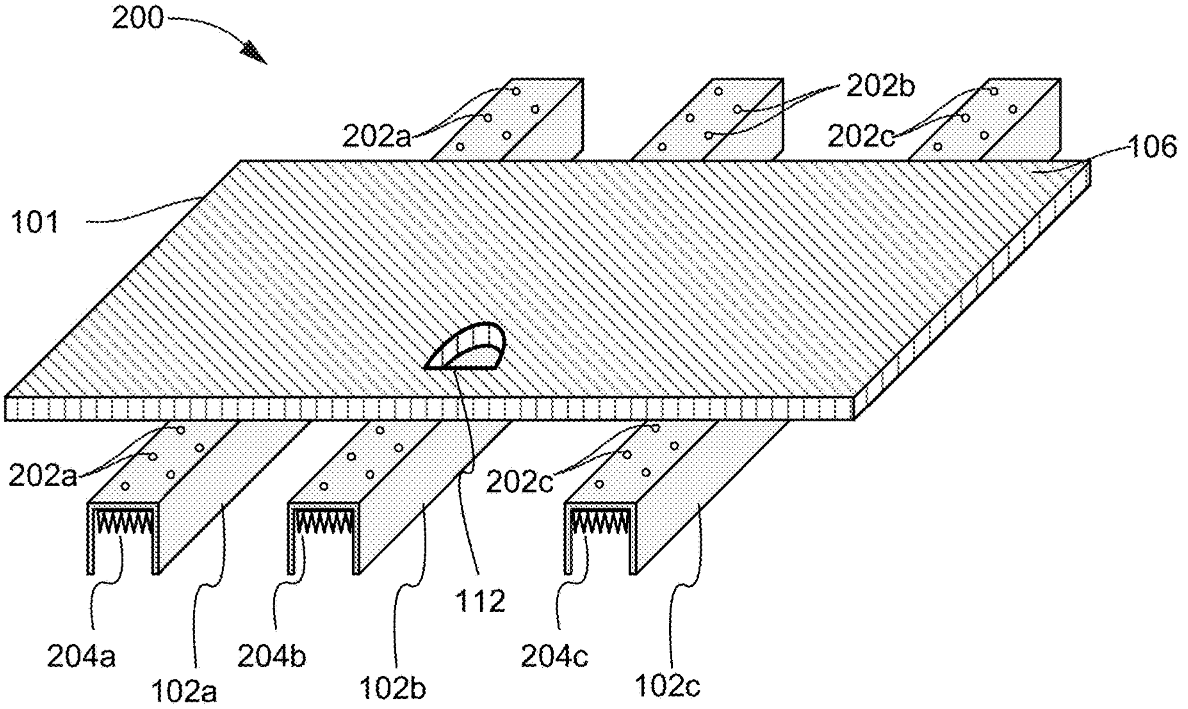
FIG. 2 is a perspective view illustrating another embodiment of an attic safety platform in accordance with aspects of the present disclosure.

FIG. 2 illustrates another embodiment of an attic safety platform 200, in accordance with aspects of the present disclosure. The attic safety platform 200 is a modification to the attic safety platform 100, where the truss brackets 102*a-c* include different truss securement mechanisms than those depicted in FIG. 1.

In some embodiments, it may be beneficial to affix the attic safety platform 200 by pressing down from the top of the platform, such the truss securement mechanisms attach the attic safety platform 200 to a top portion of the trusses or joists, e.g., by inserting one or more anchoring devices through an upper surface of the trusses or joists. For example, the truss securement mechanisms may include metal spikes or teeth that become inserted into the trusses or joists when a downward force is applied to the attic safety platform 200, such as when an individual person (e.g., the tradesperson) stands on the attic safety platform 200 or places a threshold amount of tools or materials on top of the attic safety platform.

In the depicted embodiment, the attic safety platform 200 includes a plurality of truss brackets 102*a-c*, each having a truss securement mechanisms comprising a set of spikes 202 and/or a set of teeth 204, i.e., at least a first set of spikes 202*a* and/or a first set of teeth 204*a* affixed to the first truss bracket 102*a*, a second set of spikes 202*b* and/or a second set of teeth 204*b* affixed to the second truss bracket 102*b*, and a third set of spikes 202*c* and/or a third set of teeth 204*c* affixed to the third truss bracket 102*c*. While the spikes 202 and/or teeth 204 may be composed of metal for durability and ease of inserting into wooden trusses or joists, in other embodiments the spikes 202 and/or teeth 204 may be composed of other materials or a composite of materials.

Further, the sets of spikes 202*a-c* and/or the sets of teeth 204*a-c* may be removable and replaceable, e.g., for repair or to swap with a different style of anchoring devices. In other embodiments, the sets of spikes 202*a-c* and/or the sets of teeth 204*a-c* may be integrally formed with a corresponding truss bracket 102, so that replacement of a respective set of spikes 202 and/or set of teeth requires replacement of the corresponding truss bracket 102.

In certain embodiments, the size and number the spikes 202 and/or teeth 204 may require the tradesperson to use a prybar or similar tool to remove the attic safety platform 200. In other embodiments, the size and number of the spikes 202 and/or teeth 204 may be such that the typical tradesperson can remove the attic safety platform 200 from the trusses/joints by hand (i.e., without needing to use any tools). While FIG. 2 shows each truss bracket 102 having a set of spikes 202 and/or a set of teeth 204, in other embodiments, only one truss bracket 102 includes the truss securement mechanism comprising a set of spikes 202 and/or a set of teeth 204.

Figure 3:
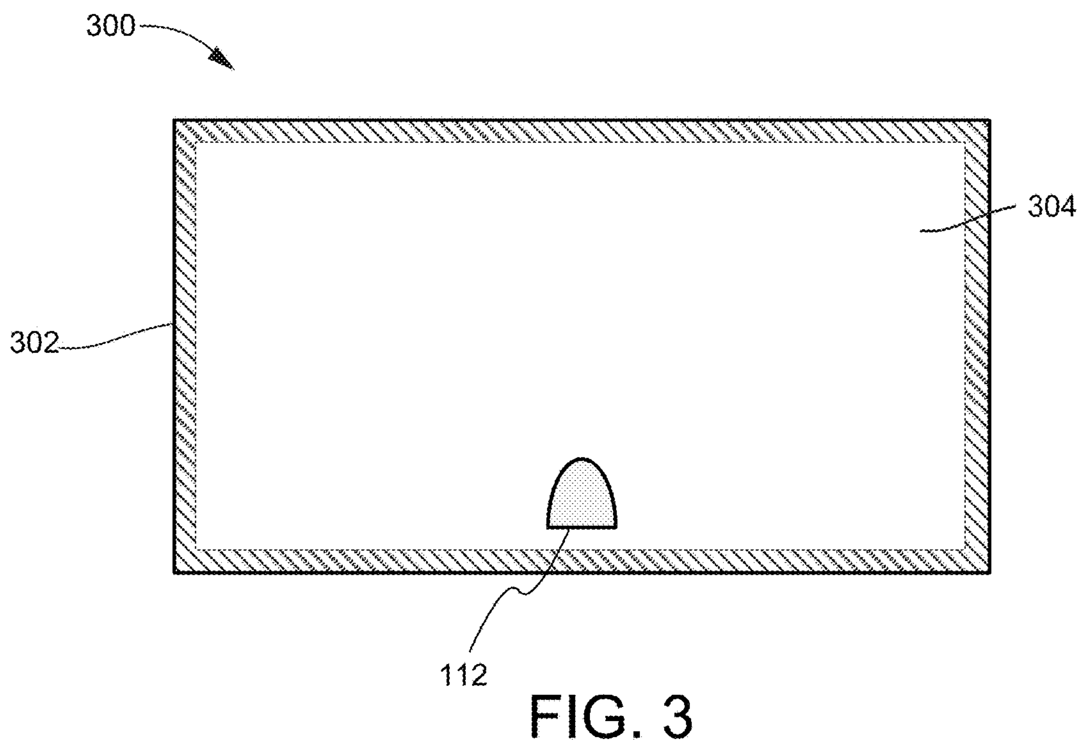
FIG. 3 is a top view further illustrating one embodiment of an attic safety platform in accordance with aspects of the present disclosure.

FIG. 3 illustrates a top view of an exemplary attic safety platform 300. In certain embodiments, the attic safety platform 300 may implement, or may be implemented by, the attic safety platform 100 or attic safety platform 200. The attic safety platform 300 includes at least a platform base 302, which may be substantially the same as the platform base 101, and a top layer 304, which may be substantially the same as the top layer 106. In certain embodiments, the top layer 304 may be a thin surface layer which extends slightly beyond the top surface of the platform base 302. In other embodiments, the top layer 304 may be flush with the borders of an upper surface of the platform base 302. In yet other embodiments, the top layer may be slightly smaller than the platform base 302 and may be located at an interior region of the upper surface of the platform base 302. For example, the platform base 302 may include a raised lip at the perimeter of the upper surface, and the top layer 304 may be inserted within an area bounded by the raised lip.

The top layer 304 of the platform base 302 may be textured; the texture may include ribs, ridges, bumps, or any other texture which increases friction. Alternatively, the top layer 304 texture may consist of different materials such as rubber, vinyl, traction tape, grip tape, and the like. In certain embodiments, the top layer may be expanded metal, perforated metal, a metal grid, or the like.

In some embodiments, the top layer 304 may be secured to the platform base 101, e.g., using fasteners (e.g., screws, nails, bolts, rivets, or the like), or using an industrial adhesive. In other embodiments, the top layer 304 is co-molded with the platform base 101 to eliminate the need for fasteners or adhesives.

In some embodiments, an external border of the top layer 304 is brightly colored and/or reflective to serve as a safety warning for the platform's edge. For example, an inch (2.5 cm) along the upper perimeter of the top layer 304 may be brightly colored and/or reflective. Alternatively, the top layer 304 may have an external border of striped yellow and black hazard tape. In further embodiments, the front, back, right, and left sides of the platform base 302 may have the same coloration as the external border of the top layer 304.

Figure 4:
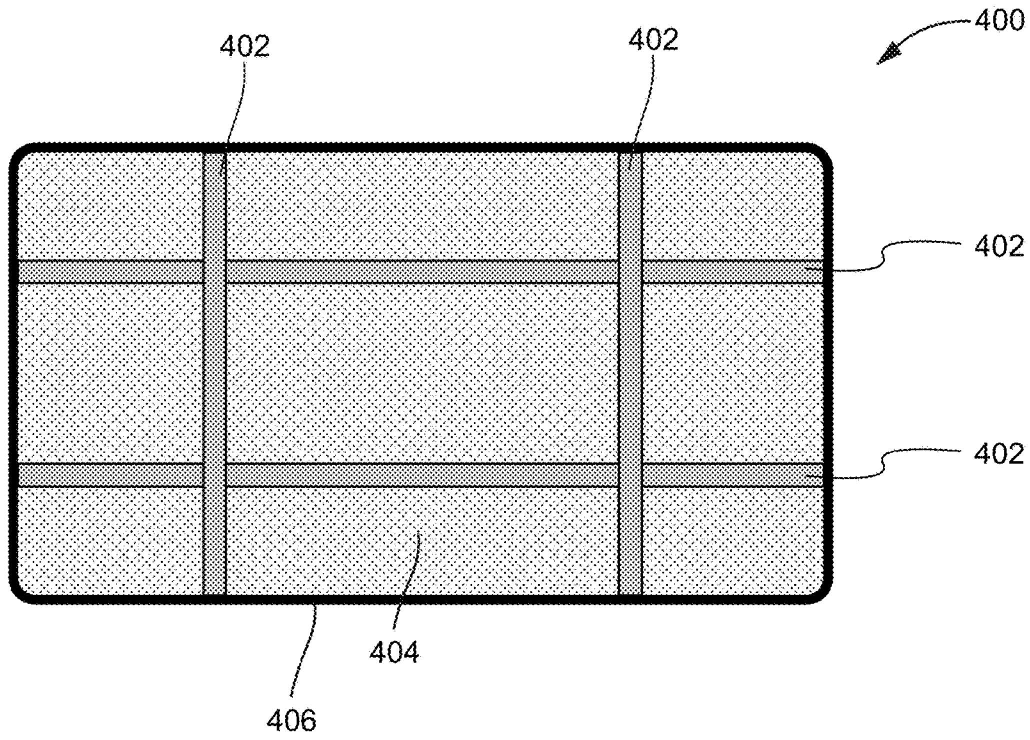
FIG. 4 is a bottom view illustrating one embodiment of an attic safety platform in accordance with aspects of the present disclosure.

FIG. 4 depicts an exemplary bottom view of one embodiment of an attic safety platform 400, in accordance with aspects of the present disclosure. In certain embodiments, the attic safety platform 400 may implement, or may be implemented by, the attic safety platform 100 or attic safety platform 200, with the truss brackets 102 removed, or may implement or be implemented by the attic safety platform 300.

In various embodiments, the attic safety platform 400 includes a set of braces 402 secured to the underside of the platform base 404. In certain embodiments, the set of braces 402 allows the platform base 404 to be thinner and/or lighter. In certain embodiments the set of braces 402 allows the platform base 404 to be made of a more flexible material than would be practical without the braces 402.

The size and placement of the braces 402 may be selected to reduce the weight of the attic safety platform 400, increase the rigidity of the attic safety platform 400, and/or allow the attic safety platform 400 to support a larger weight. In one embodiment, one or more of the braces 402 may be formed from a metal bar having a rectangular profile. As an example, the metal bar may be 2 inches wide and ¼ inch thick. As another example, the metal bar may be 2 inches wide and ⅛ inch thick. While FIG. 4 depicts a #-shaped pattern of the braces 402, in other embodiments the bracing may be arranged in other patterns.

In some embodiments, the attic safety platform 400 may include a perimeter 406 attached to the platform base 404 and, optionally, to the set of braces 402. In certain embodiments, the perimeter 406 may be made from a strong and/or stiff material (e.g., steel, aluminum, fiberglass, carbon fiber, composite, high-density polymer, reinforced polymer, or the like) to increase the rigidity of the attic safety platform 400 and/or allow the attic safety platform 400 to support a larger weight. For example, the perimeter 406 may be attached to the set of braces 402 to form a framework upon which the platform base 404, truss brackets (e.g., a set of truss brackets 102), and/or another part of the attic safety platform 400 can be attached.

In some embodiments, the perimeter 406 may be covered in a soft or padded material to reduce the risk of injury or damage should the attic safety platform collide edge-on with a person or object. For example, the outside of the perimeter 406 may be covered in foam. As another example, the outer layer of the perimeter 406 may comprise a layer of rubber, synthetic rubber, neoprene rubber, nitrile rubber, silicone, thermoplastic polymer, polyurethane, vinyl foam, PVC (polyvinyl chloride) foam, or similar soft material for cushioning a collision or blow. The soft material could be molded into the perimeter 406, attached by adhesive or mechanical fastener, or the like.

Figure 5:
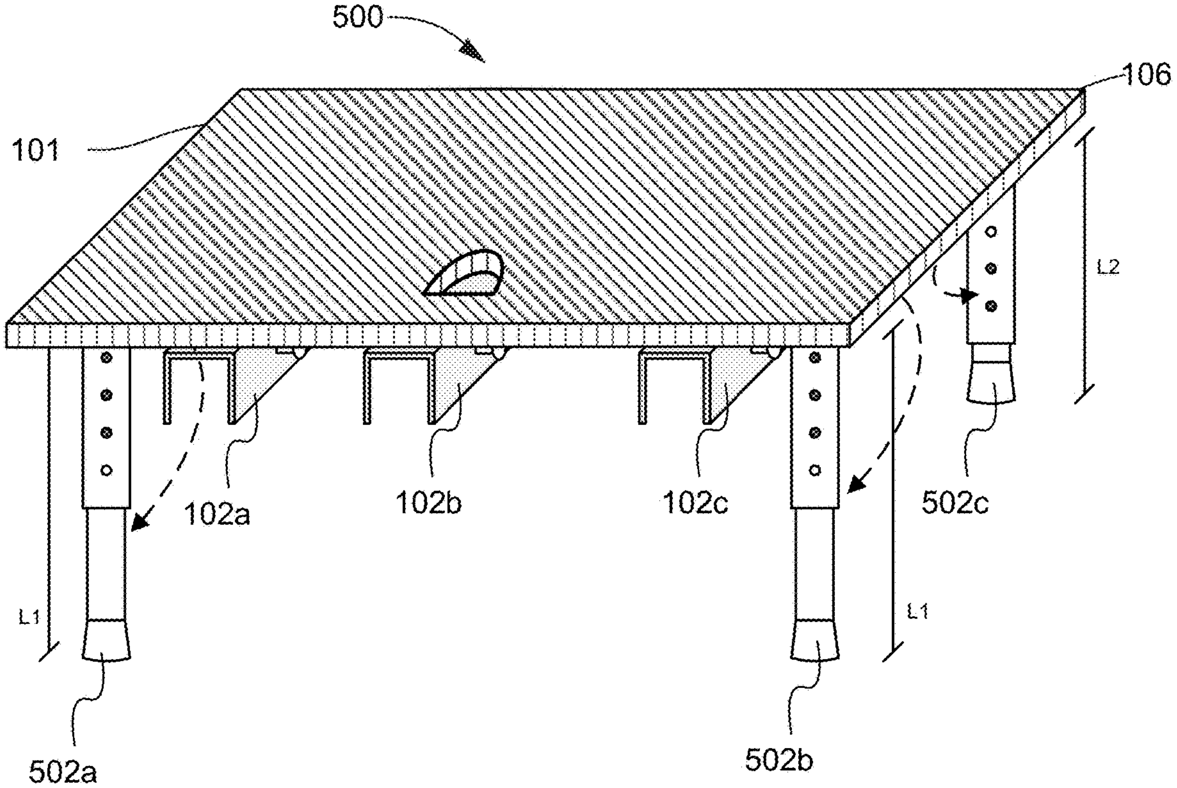
FIG. 5 is a perspective view illustrating another embodiment of an attic safety platform in accordance with aspects of the present disclosure.

FIG. 5 depicts an alternative embodiment of an attic safety platform 500, in accordance with aspects of the present disclosure. The attic safety platform 200 may be a modification to the attic safety platform 100 and/or the attic safety platform 200, such that multiple legs 502 are attached to the underside of the attic safety platform 500.

In one embodiment, the legs 502 may be located near the corners of the attic safety platform 500. In certain embodiments, the legs 502 may be hinged, so that they can fold up near the edges of the attic safety platform 500 when the legs 502 are not being used. In certain embodiments, the legs 502 can be detached from the attic safety platform 500.

In certain embodiments, the legs 502 may be extendable to multiple lengths. In the depicted embodiment, the legs 502*a* and 502*b* are extended to a first length "L1", while the leg 502*c* is extended to a second length "L2" that is shorter than the first length. While not visible in the embodiment of FIG. 5, it is assumed that there is a fourth leg attached to the attic safety platform 500 at or near the remaining corner.

Beneficially, the addition of the legs 502 allows the attic safety platform 500 to be used on stairs, slopes, and other uneven surfaces. In certain embodiments, the legs 502 allows the attic safety platform 500 away from an attic environment.

Figure 6:
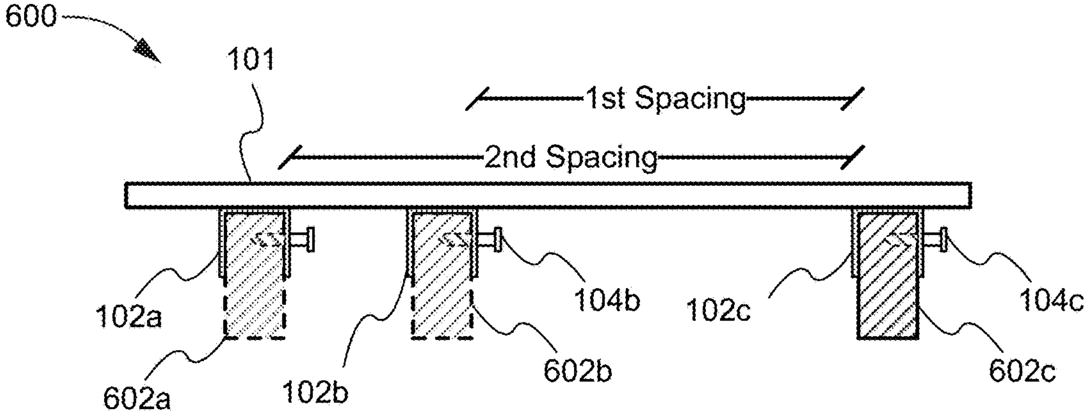
FIG. 6 is a side view illustrating one embodiment of an attic safety platform in accordance with aspects of the present disclosure.

FIG. 6 is a side view of a safety platform 600 illustrating an embodiment where there are three truss brackets 102*a-c* (or three in-line sets of truss brackets 102). In certain embodiments, the safety platform 600 may implement, or may be implemented by, the attic safety platform 100, the attic safety platform 200 or the attic safety platform 500. A first pair of brackets comprising truss bracket 102*b* and 102*c* are positioned at a first spacing from one another, which may correspond to one standard truss spacing or joist spacing, e.g., 16 inches on center (16" O.C.). For increased compatibility with different layouts, a second pair of brackets comprising truss bracket 102*a* and 102*c* are positioned at a second spacing from one another, which may correspond to another standard truss spacing or joist spacing, e.g., 24 inches on center (24" O.C.). In various embodiments, the spacing of the truss brackets 102 may conform to regional standard spacings of trusses or joists.

To secure the safety platform 600 to a truss 602, one or more of the truss brackets 102 may include at least one truss securement mechanism 104. FIG. 6 depicts an embodiment of the attic safety platform 100, where the truss securement mechanism 104 includes at least one horizontal spike, e.g., to be inserted into a truss 602*a*, 602*b*. In another embodiment, the truss securement mechanism 104 may include a threaded vice system, where one end of the truss securement mechanism 104 has a flat surface to contact the truss 602. In such embodiments, the threaded vice system allows the truss securement mechanism 104 to attach to the truss without creating holes within the truss for securement.

Figure 7:
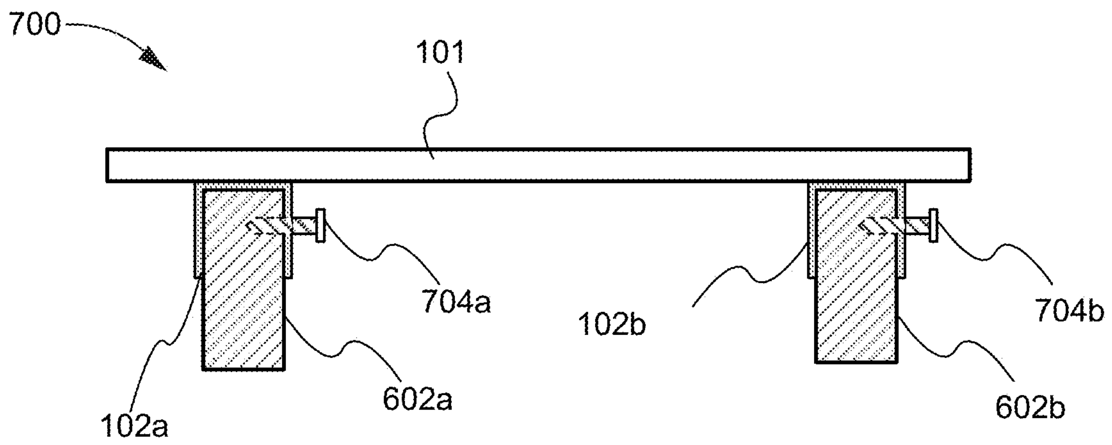
FIG. 7 is a side view illustrating another embodiment of an attic safety platform in accordance with aspects of the present disclosure.

FIG. 7 depicts a simplified embodiment of an attic safety platform 700, where the truss securement mechanisms 704 comprises a threaded spike to be screwed into a truss. In certain embodiments, the attic safety platform 700 may implement, or may be implemented by, a simplified variant of the attic safety platform 100, the attic safety platform 200 or the attic safety platform 500. While FIG. 7 depicts only two truss brackets 102*a*, 102*b* and two truss securement mechanisms 704*a*, 704*b*, in other embodiments the attic safety platform 700 may have more truss brackets 102 and truss securement mechanisms 704.

Figure 8:
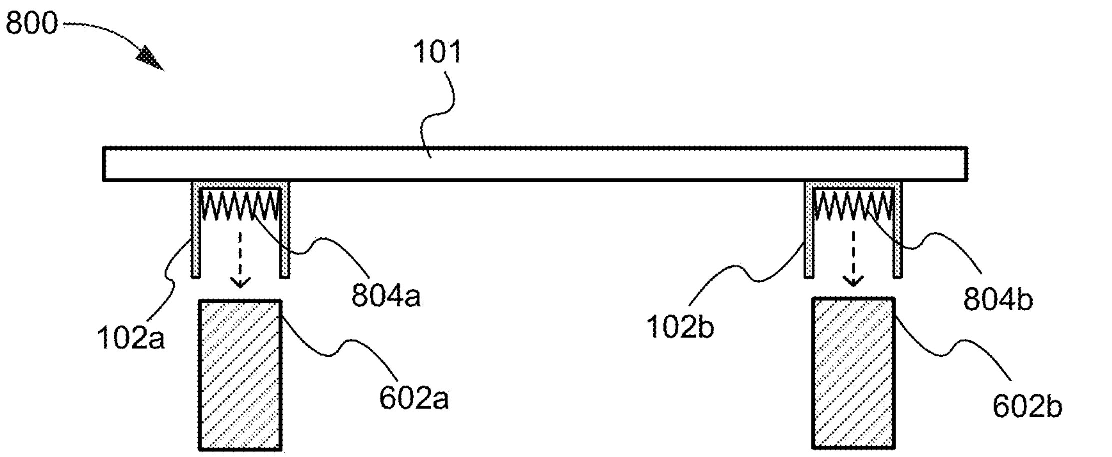
FIG. 8 is a side view further illustrating yet another embodiment of an attic safety platform in accordance with aspects of the present disclosure.

FIG. 8 depicts a simplified embodiment of an attic safety platform 800, where the truss securement mechanism 804 comprises a vertical teeth to be inserted into a truss via a downward force applied to the attic safety platform 800. In certain embodiments, the attic safety platform 800 may implement, or may be implemented by, a simplified variant of the attic safety platform 100, the attic safety platform 200 or the attic safety platform 500. While FIG. 8 depicts only two truss brackets 102*a*, 102*b* and two truss securement mechanisms 804*a*, 804*b*, in other embodiments the attic safety platform 800 may have more truss brackets 102 and truss securement mechanisms 804.

Figure 9:
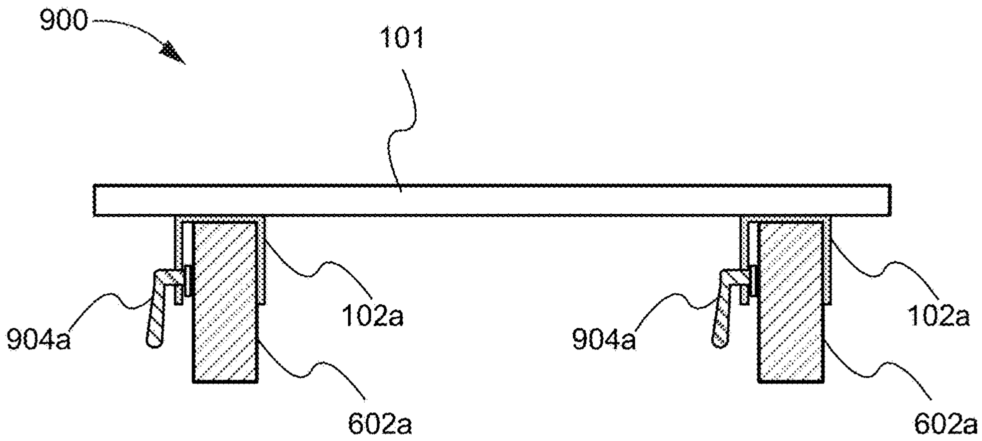
FIG. 9 is a side view further illustrating still another embodiment of an attic safety platform in accordance with aspects of the present disclosure.

FIG. 9 depicts a simplified embodiment of an attic safety platform 900, where the truss securement mechanism 904 comprises a quick-release clamp having a lever on one side of the truss bracket 102 and a coupling surface (e.g., truss attachment pad point) on the other side of the truss bracket 102, as shown in FIG. 9. In certain embodiments, the attic safety platform 900 may implement, or may be implemented by, a simplified variant of the attic safety platform 100, the attic safety platform 200 or the attic safety platform 500. In one embodiment, the quick-release clamp may be a rotating clamp where the tradesperson twists the lever in one direction to attach the truss bracket 102 to the truss 602, and twists the lever in the opposite direction to release the truss bracket 102 from the truss 602. In another embodiment, the quick-release clamp may be a camming clamp or horizontal clamp where the tradesperson moves (throws) the lever in one direction to attach the truss bracket 102 to the truss 602, and moves the lever in the opposite direction to release the truss bracket 102 from the truss 602.

Figure 10A:
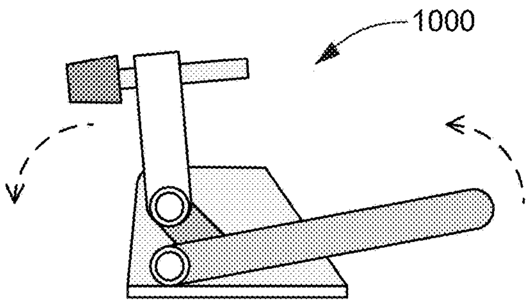
FIG. 10A illustrates one embodiment of a quick-release clamp in a first operational state in accordance with aspects of the present disclosure.

FIG. 10A depicts one embodiment of a quick-release clamp in a first operational state 1000. In certain embodiments, the quick-release clamp may implement, or may be implemented by, the truss securement mechanism 904. With the lever moved to the right, the clamp coupling surface is rotated rightward. In this way, the quick-release clamp can be in an "open" state where the attic safety platform 100 can move relative to a truss, beam, stud, or joist. In some embodiments, the quick-release clamp may have teeth or a textured surface to grasp the truss 602. In other embodiments, quick-release clamp may have a rubber coated arm to prevent damage to the truss 602.

Figure 10B:
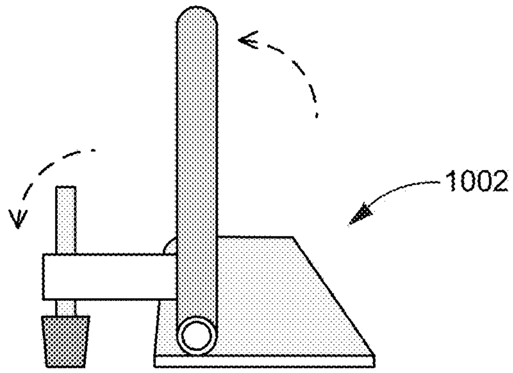
FIG. 10B illustrates one embodiment of a quick-release clamp in a second operational state in accordance with aspects of the present disclosure.

FIG. 10B depicts one embodiment of a quick-release clamp in a second operational state 1002. In certain embodiments, the quick-release clamp may implement, or may be implemented by, the truss securement mechanism 904. With the lever moved to the left, the clamp coupling surface is rotated leftward. In this way, the quick-release clamp can be in an "closed" state where the attic safety platform 100 is affixed to the truss, beam, stud, or joist. In some embodiments, the quick-release clamp may have teeth or a textured surface to grasp the truss 602. In other embodiments, quick-release clamp may have a rubber coated arm to prevent damage to the truss 602.

While FIGS. 1, 2, 5, 6, 7, 8, and 9 depict examples of safety platforms where each truss bracket 102 includes the same type and number of truss securement mechanisms 104, in other embodiments at least one truss bracket 102 includes a different type of truss securement mechanisms 104 than another truss bracket 102 of the same safety platform. Moreover, at least one truss bracket 102 may include multiple truss securement mechanisms 104, and the same type or different types of truss securement mechanisms 104 may be present on the at least one truss bracket 102.

In some embodiments, there are two truss securement mechanisms 104 (e.g., spikes, quick-release clamps, etc.) per truss bracket 102, for example, one on each end of the truss bracket 102. In other embodiments, there may be multiple truss securement mechanisms 104 (e.g., spikes, quick-release clamps, etc.) along the truss bracket 102 to provide multiple securement points to a truss 602.

In some embodiments, truss brackets 102 are a two-piece adjustable system. For example, the truss brackets 102 may include a solid L-shape with an adjustment system for a second solid flat piece move and secure to a truss. Together the L-shape and flat piece form an adjustable u-shaped bracket to fit over a truss. To adjust the width of the truss bracket 102 the solid flat piece is tightened to the size of the truss.

In some embodiments, the flat piece is tightened using a vice system. In alternative embodiments, the flat piece is tightened by a quick-release clamp. In some embodiments, the flat piece has one adjustment point making the truss bracket 102 have a constant width. In some embodiments, the flat piece has multiple adjustment points along the truss bracket 102 to allow fine tuning the width of the truss bracket 102 to tightly fit a truss.

In some embodiments, truss brackets 102 are a multiple piece adjustable system. In such an embodiment, truss bracket 102 has a solid L-shape and a n-number of flat pieces adjustably secured to the solid L-shaped piece. The n-number of flat pieces are individually adjustable by vice or quick clamp to tightly fit a truss. The truss brackets 102 may be secured along multiple points along a truss, especially if the truss is not consistent in width. Different segments can have different widths, rather than one consistent truss bracket 102 width.

In some embodiment, the truss brackets 102 are set to a standard spacing found in floor joist and/or trusses. In some embodiments, truss brackets 102 are spaced 24 inches on-center apart from one another. In some embodiments, truss brackets 102 are spaced 16 inches apart on center from one another.

FIGS. 11A-11D and 12A-12B depict various embodiments of adjustable truss brackets 102 of a safety platform 1101, in accordance with aspects of the present disclosure.

FIGS. 11A-11D depict an exemplary implementation of the safety platform 1101 having adjustable truss brackets 102, where the truss brackets 102 may rotate with respect to a platform base. In certain embodiments, the safety platform 1101 may implement, or may be implemented by, a simplified variant of the attic safety platform 100, the attic safety platform 200 or the attic safety platform 500. In the example of FIGS. 11A-11D, the safety platform 1101 includes a first truss bracket 102*a* having a first truss securement mechanism 104*a* and a second truss securement mechanism 104*b*, and also includes a second truss bracket 102*b* having a third truss securement mechanism 104*c* and a fourth truss securement mechanism 104*d*.

Figure 11A:
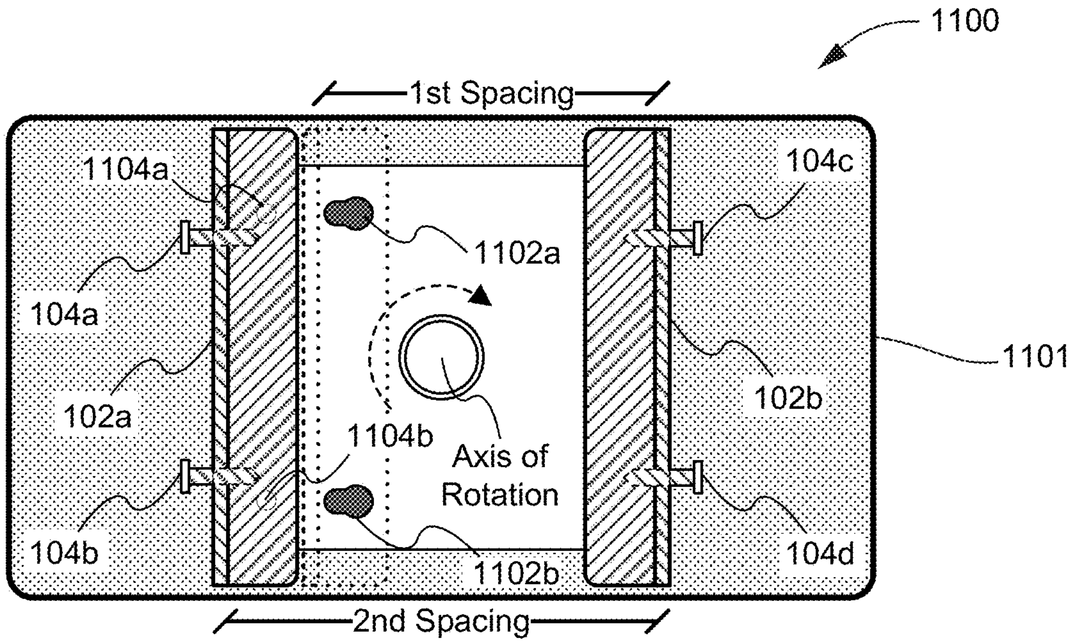
FIG. 11A is a bottom view illustrating an attic safety platform in a first rotational state in accordance with aspects of the present disclosure.

FIG. 11A depicts a first rotational state 1100 associated with the safety platform 1101. In one embodiment, the safety platform 1101 is rectangular and, when in the first rotational state, the truss brackets 102 are parallel to the short side of the rectangular safety platform 1101.

Note that the safety platform 1101 may allow for adjustment of a spacing (i.e., linear distance) between the adjustable truss brackets 102, and allow permit rotation of the truss brackets 102 with respect to the platform base. For example, at least the truss bracket 102*a* may be attached to the platform base using a pair of keyhole slots 1102*a*, 1102*b* in a rotation plate and a pair of pins 1104*a*, 1104*b* in the truss bracket 102*a*, where the keyhole slots 1102 have a larger through-hole into which the pins 1104 can be inserted and a narrower end into which the pins 1104 cannot be removed, thus securing the truss bracket 102*a* in place. A first pair of keyhole slots allows the truss bracket 102*a* to be located at a first spacing from the truss bracket 102*b*, while a second pair of keyhole slots allows the truss bracket 102*a* to be located at a second spacing from the truss bracket 102*b*.

Figure 11B:
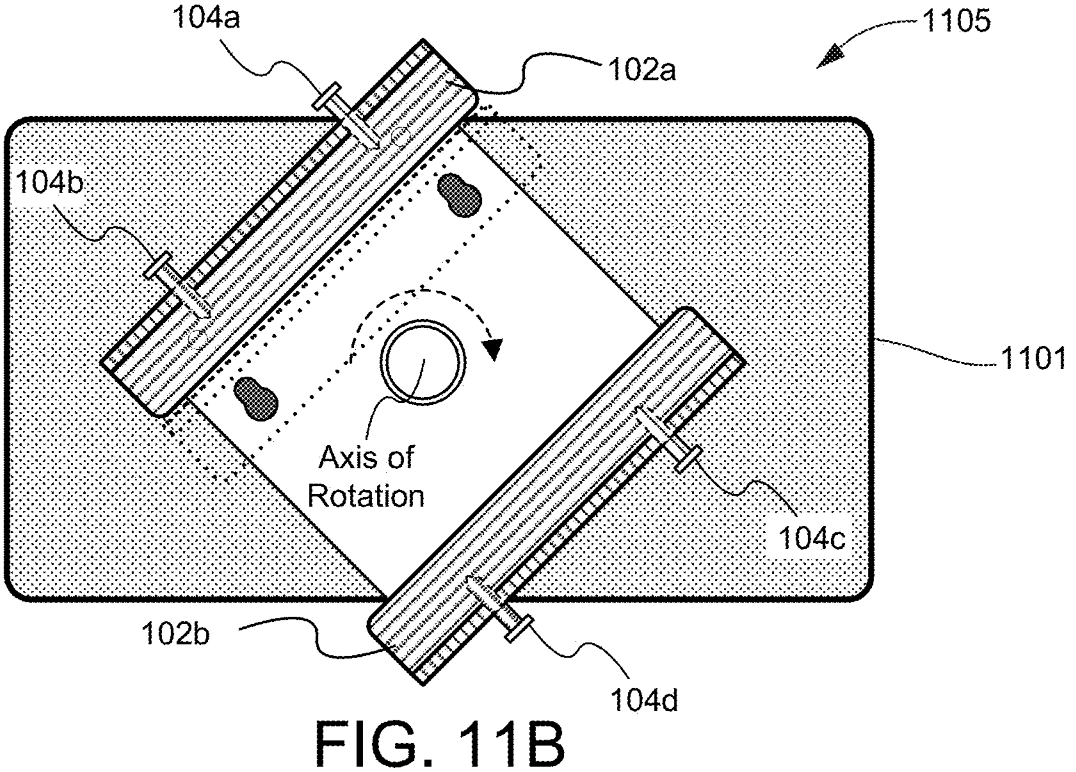
FIG. 11B is a bottom view illustrating an attic safety platform of FIG. 11A in a first intermediate rotational state in accordance with aspects of the present disclosure.
Figure 11C:
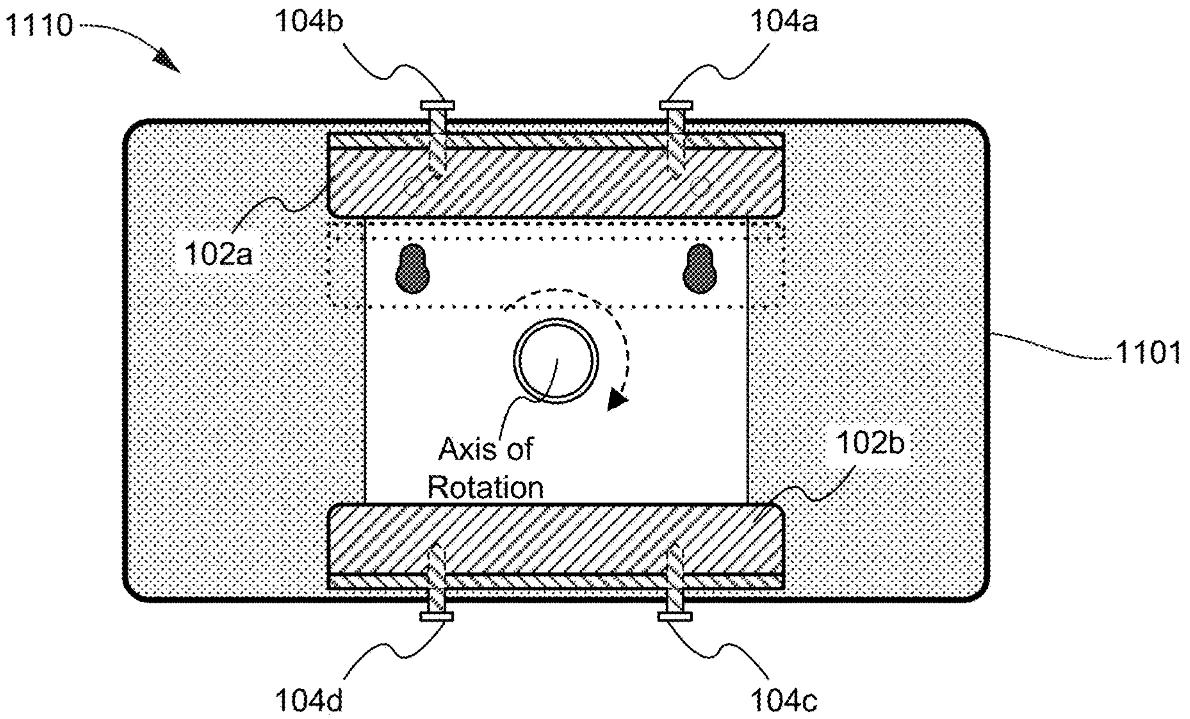
FIG. 11C is a bottom view further illustrating an attic safety platform of FIGS. 11A and 11B in a second rotational state in accordance with aspects of the present disclosure.
Figure 11D:
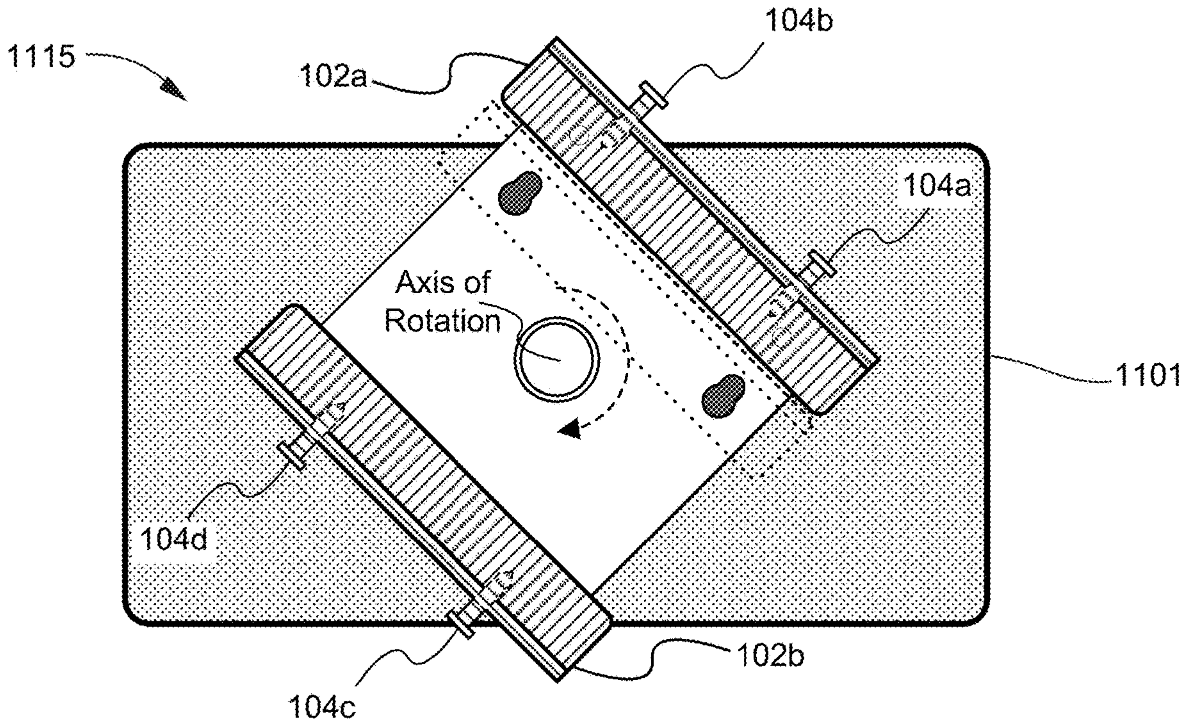
FIG. 11D is a bottom view further illustrating an attic safety platform of FIGS. 11A, 11B, and 11C in a second intermediate rotational state in accordance with aspects of the present disclosure.

FIG. 11B depicts a first intermediate rotational state 1105 where the truss brackets 102 are neither parallel nor perpendicular to the long side of the attic safety platform 100. Here, the truss brackets 102 are rotated 45 degrees from the first rotational state 1100. FIG. 11C depicts a second rotational state 1110. In the embodiment of FIG. 11C, the truss brackets 102 are perpendicular to the long side of the attic safety platform 1101 when in the second rotational state 1110. Here, the truss brackets 102 are rotated 90 degrees from the first rotational state 1100. FIG. 11D depicts a second intermediate rotational state 1115 where the truss brackets 102 are neither parallel nor perpendicular to the long side of the attic safety platform 100. Here, the truss brackets 102 are rotated 135 degrees from the first rotational state 1100.

In some embodiments, the truss brackets 102 may lock into the first or second rotational states. In one embodiment, the truss brackets 102 lock in place in two positions corresponding to 0 degree rotation and 90 degree rotation (and optionally 180 degree rotation). In another embodiment, the truss brackets 102 may be locked in place at any angle between 0 degrees and 90 degrees (or between 0 degrees and 180 degrees). In some embodiments, the truss brackets 102 may be biased to the first rotational state 1100 or the second rotational state 1110. While FIGS. 11A-11D shows one embodiment wherein the truss brackets 102 are rotatable up to 135 degrees, in other embodiments the truss brackets 102 may rotate to a greater angle or a lesser angle.

Figure 12A:
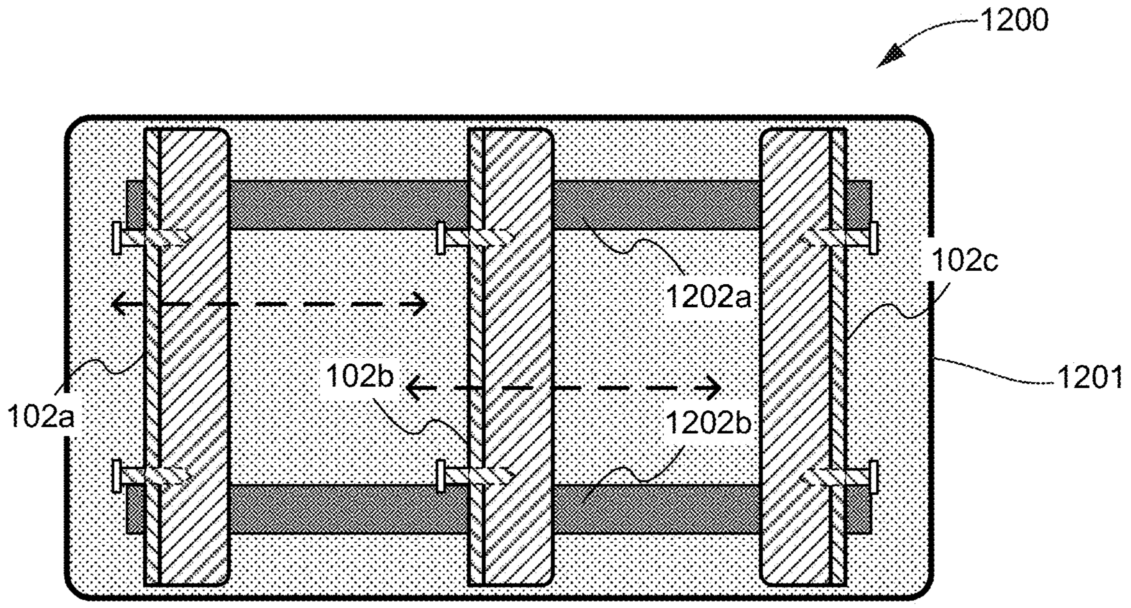
FIG. 12A is a bottom view further illustrating an attic safety platform in a first translational state in accordance with aspects of the present disclosure.
Figure 12B:
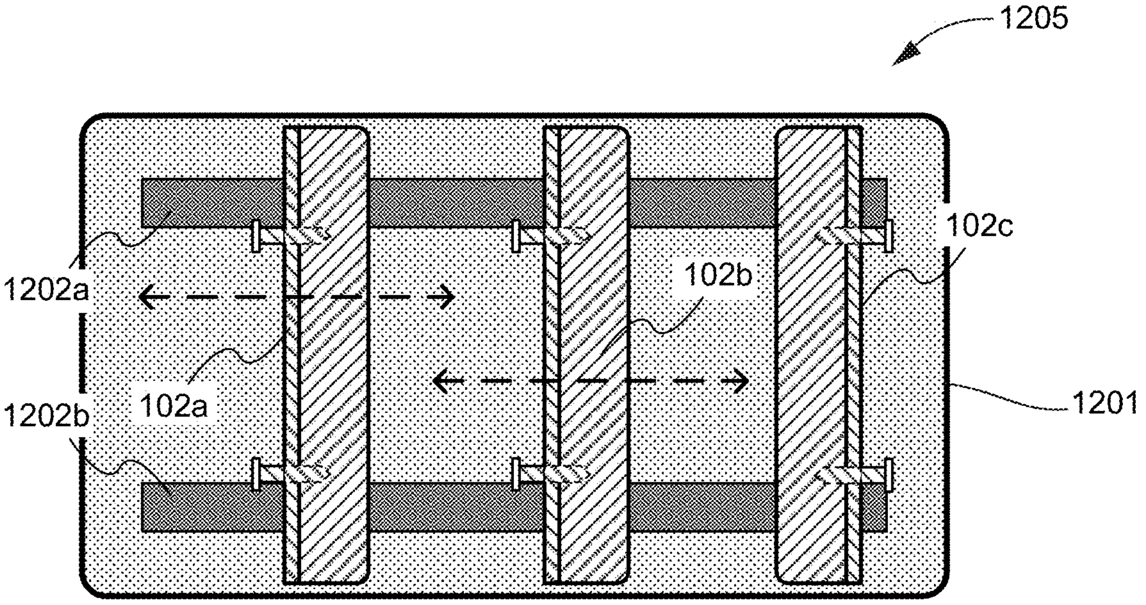
FIG. 12B is a bottom view further illustrating the attic safety platform of FIG. 12A in a second translational state in accordance with aspects of the present disclosure.

FIGS. 12A-12B depict an exemplary implementation of a safety platform 1201 having linearly adjustable truss brackets 102, where the truss brackets 102 may move along tracks 1202*a*, 1202*b* (e.g., on an underside of the platform base) to adapt to different spacings of the trusses. In certain embodiments, the safety platform 1201 may implement, or may be implemented by, a simplified variant of the attic safety platform 100, the attic safety platform 200 or the attic safety platform 500. In the example of FIGS. 12A-12B, the safety platform 1201 includes a first truss bracket 102*a*, a second truss bracket 102*b*, and also a third second truss bracket 102*c*. The truss brackets 102 are linearly adjustable along a first track 1202*a* and a second track 1202*b*.

FIG. 12A depicts a first translational state 1200 associated with the safety platform 1201. In one embodiment, the safety platform 1201 is rectangular and the tracks 1202*a*, 1202*b* are parallel to the long side of the rectangular safety platform 1201. In the example of FIG. 12A, the leftmost truss bracket 102*a* and the rightmost bracket 102*c* are extended away from the centermost truss bracket 102*b*, which is located near a center of the safety platform 1201.

FIG. 12B depicts a second translational state 1205 associated with the safety platform 1201. In the example of FIG. 12A, the leftmost truss bracket 102*a* and the rightmost bracket 102*c* are moved in towards the center of the safety platform 1201.

In some embodiments, one truss bracket (e.g., the leftmost truss bracket 102*a*) may be fixed in place and a second truss bracket (e.g., the centermost truss bracket 102*b*) may be movable relative to the first truss bracket 102*a*. In other embodiments, the first truss bracket 102*a* may be fixed and the second truss bracket 102*b* may be movable between 12 inches from center up to 24 inches from center. In another embodiment, truss brackets 102*a*, 102*b* are fixed relative to one another but as a unit may move linearly along the tracks 1202*a*, 1202*b*.

In one embodiment, an attic safety platform can connect to at least one other attic safety platform, as shown in FIGS. 13 and 14A-14C.

Figure 13:
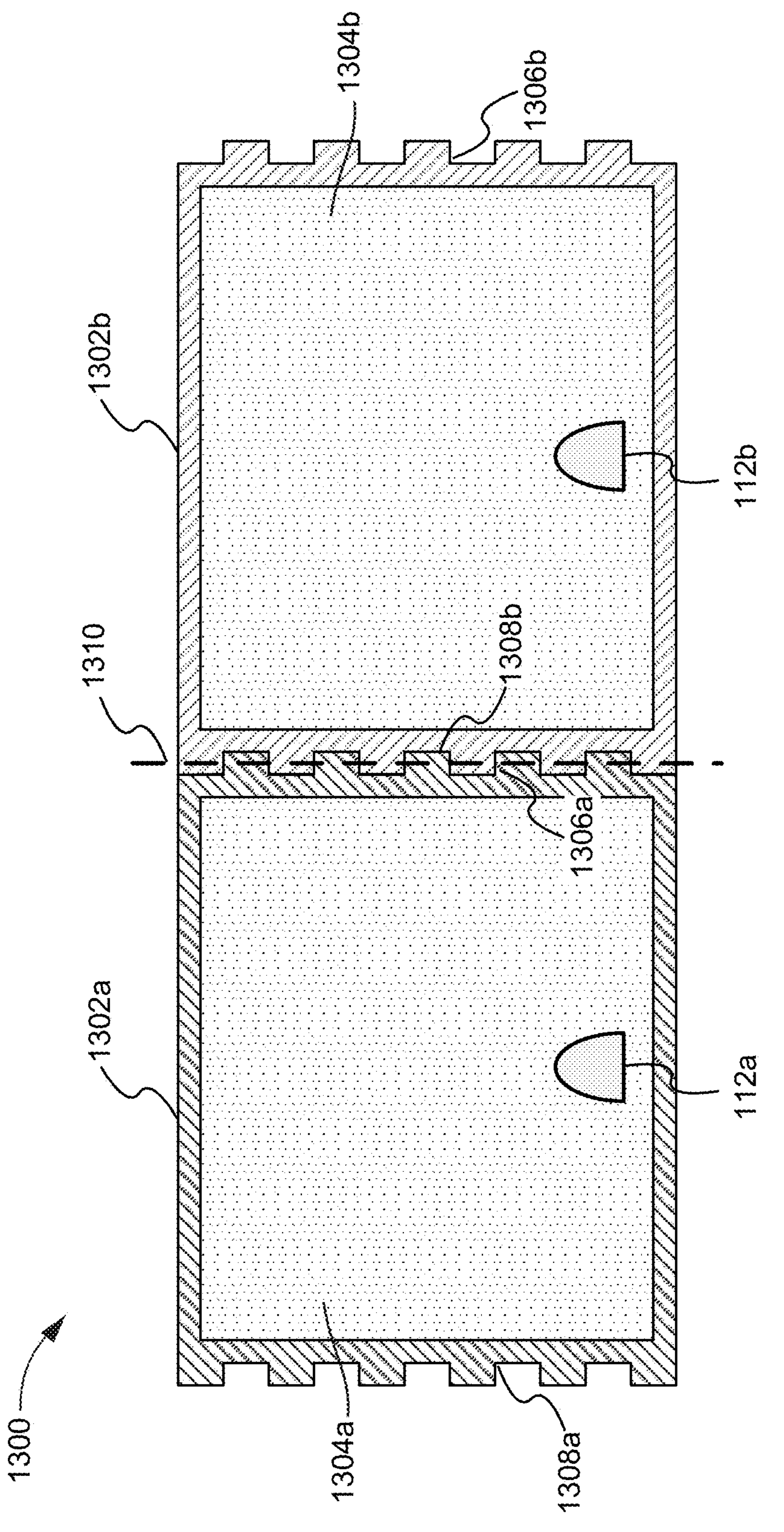
FIG. 13 is one embodiment of two interlocked attic safety platforms in accordance with aspects of the present disclosure.

FIG. 13 depicts a first arrangement 1300 of multiple safety platforms, wherein two platforms 1302*a* and 1302*b* may be connected along one edge of the platform base 1304*a* of the first platform 1302*a* by an interlocking patterns comprised of an interlocking edge 1306*a* and a matching edge 1308*b* of the platform base 1304*b* of the second platform 1302*b*. In certain embodiments, the platforms 1302*a* and 1302*b* may implement, or may be implemented by, a simplified variant of the attic safety platform 100, the attic safety platform 200 or the attic safety platform 500.

In the depicted embodiment, one end of each platform 1302 has one version of the interlocking edge 1306 and the opposite end of the platform 1302 has the compatible version of the matching edge 1308, thus each platform 1302 can connect to one or more additional platforms 1302. In certain embodiments, an interlocking edge 1306 and matching edge 1308 may form a hinging surface, such the platform 1302*a* may rotate with respect to the platform 1302*b* along the axis 1310.

Figure 14A:
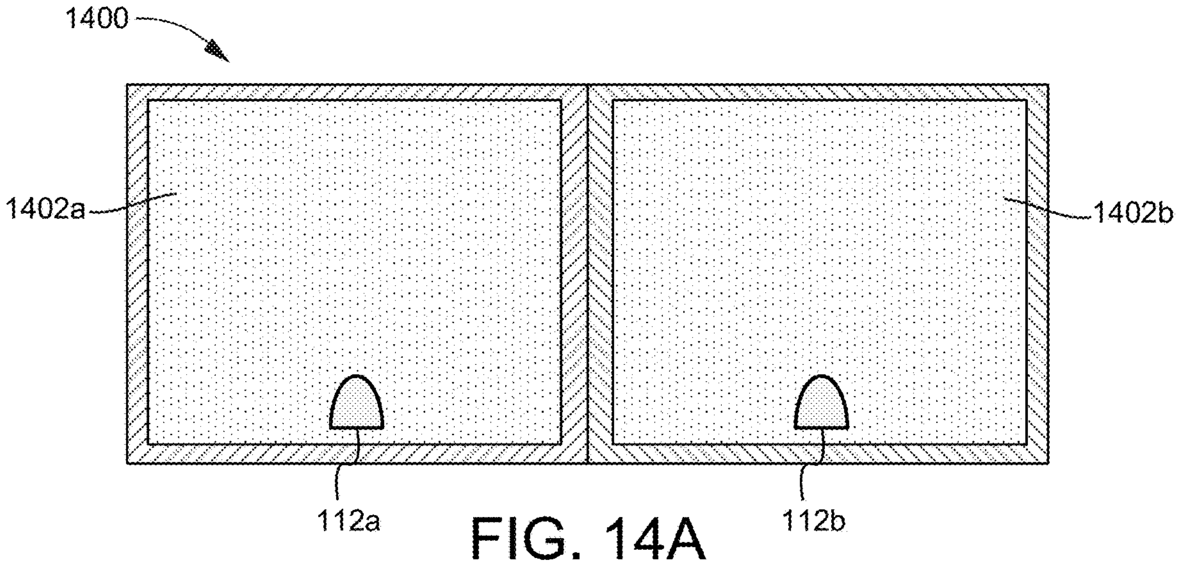
FIG. 14A is a top view of another embodiment of two connected attic safety platforms in accordance with aspects of the present disclosure.
Figure 14B:
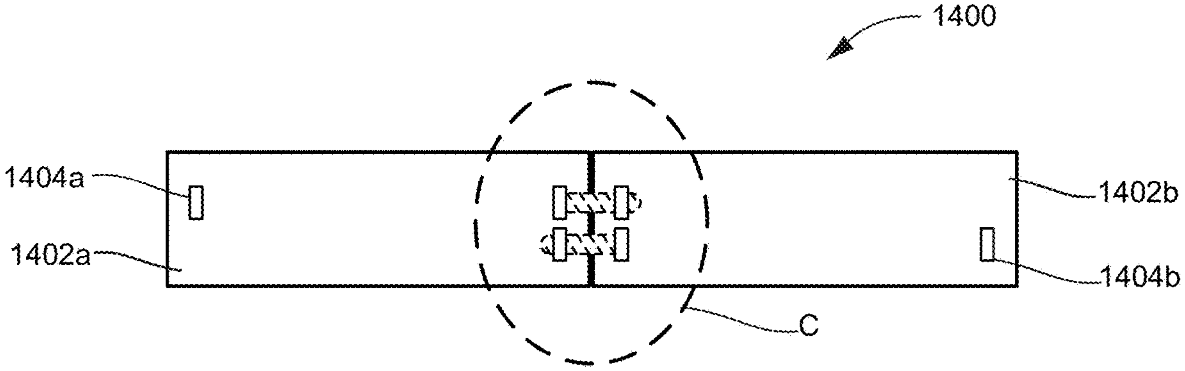
FIG. 14B is a cross sectional view of the two connected attic safety platforms of FIG. 14A.
Figure 14C:
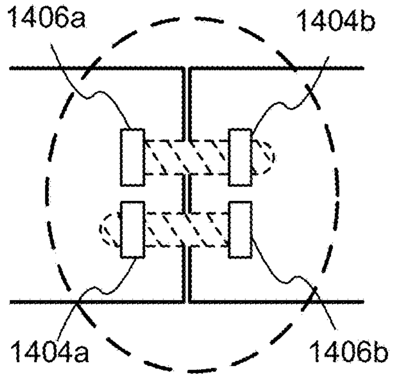
FIG. 14C is a detailed view of an area "C" of FIG. 14B.

FIG. 14A depicts a second arrangement 1400 of multiple safety platforms, wherein two platforms 1402*a* and 1402*b* may be connected along an edge of the platforms 1402. FIG. 14B depicts a cutaway view of the coupled platforms 1402*a* and 1402*b* of FIG. 14A, and FIG. 14C is a closeup view of the area labeled "C" in FIG. 14B. In certain embodiments, the platforms 1402*a* and 1402*b* may implement, or may be implemented by, a simplified variant of the attic safety platform 100, the attic safety platform 200 or the attic safety platform 500.

In the depicted embodiment, each platform 1402*a*, 1402*b* has one or more embedded nuts 1404 for receiving a bolt 1406, e.g., a captured bolt. One bolt 1406*a* passes through the platform 1402*a* and is threaded into a matching nut 1404*b* of platform 1402*b*, as shown by FIGS. 14A-14C. Similarly, another bolt 1406*b* may pass through the platform 1402*b* and is threaded into a matching nut 1404*a* of platform 1402*a*. One of ordinary skill in the art will recognize that any number of securement and/or connection methods may be used to connect two platforms together.

Figure 15:
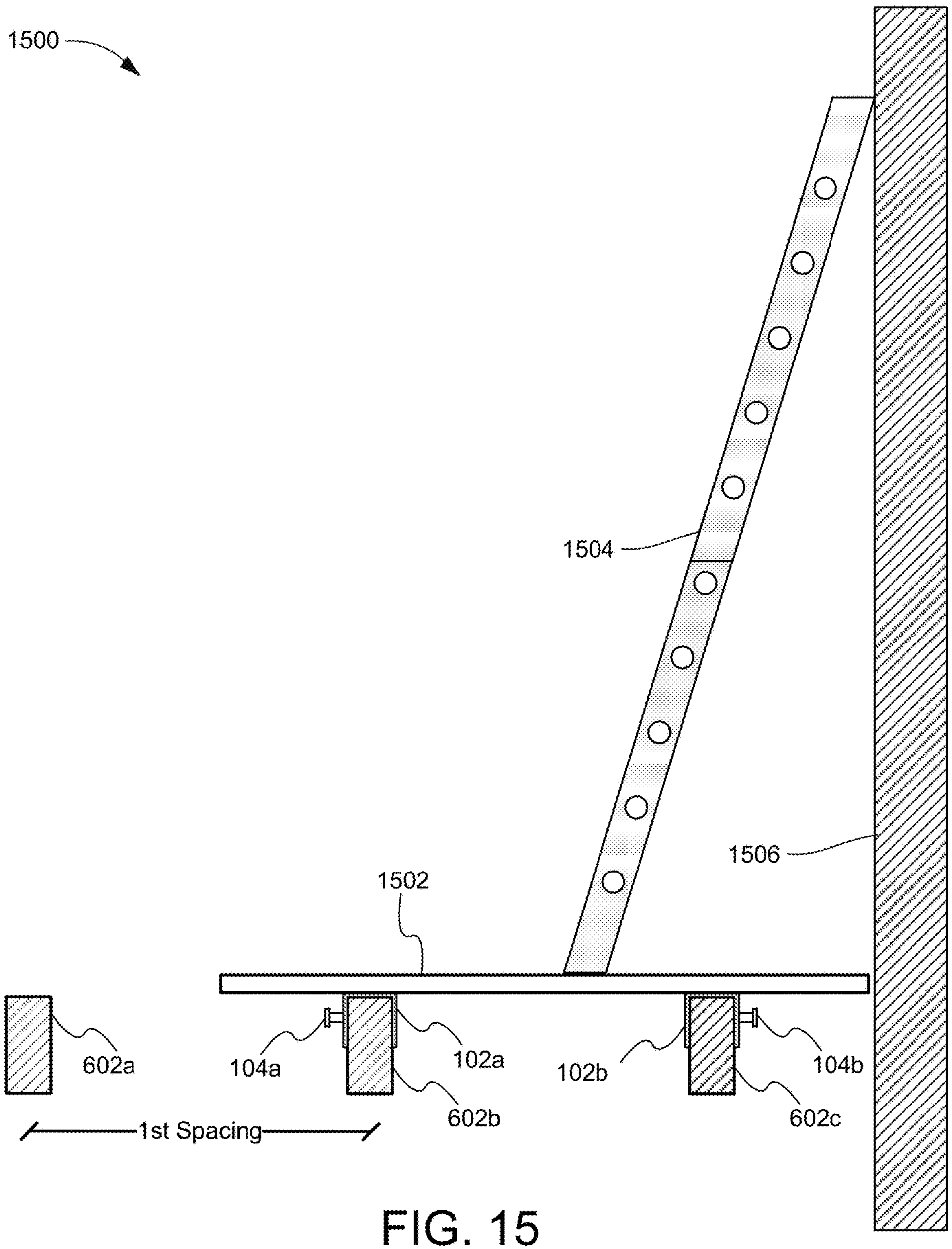
FIG. 15 illustrates one exemplary use of an attic safety platform in accordance with aspects of the present disclosure.

FIG. 15 illustrates one example of use of the attic safety platform 1502 within an attic space 1500. As shown in FIG.

15, the attic safety platform 1502 is secured to two or more trusses 602 of an attic by truss securement mechanisms 104. Once the attic safety platform 1502 is secured to the trusses, a ladder 1504, such as an extension ladder or telescoping ladder, is placed on the top of the attic safety platform 1502. In some embodiments of use, ladder 1504 is leaned up against a wall 1506. In other embodiments, ladder 1504 is freestanding step ladder resting on the top of the attic safety platform 1502. Benefits of the attic safety platform 1502 include allowing a user to safely use a ladder 1504 within the attic of a building or along a wall 1506 above the trusses 602.

Figure 16:
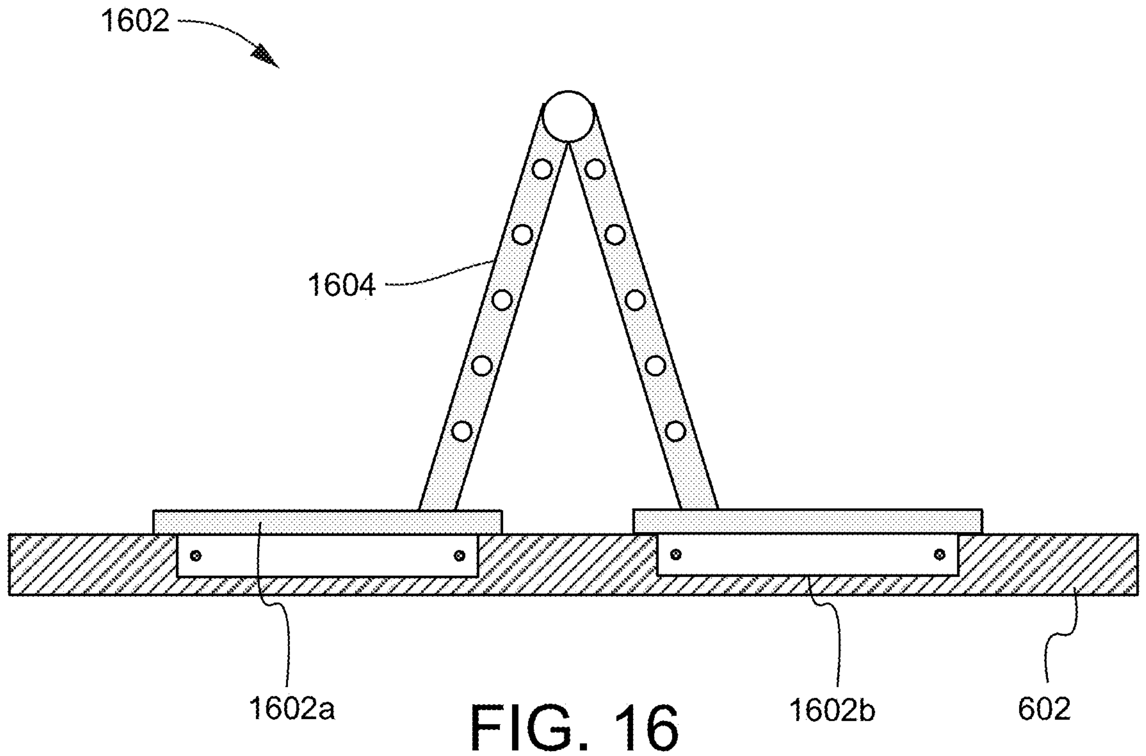
FIG. 16 illustrates another use case of an attic safety platform in accordance with aspects of the present disclosure.

FIG. 16 illustrates one example of a system 1600 for using multiple safety platforms 1602 to provide a stable platform for a ladder 1604, in accordance with aspects of the present disclosure. As shown by FIG. 16, the ladder 1604, such as a step ladder or a folding/articulating ladder, may be opened and supported by two safety platforms 1602*a*, 1602*b*, respectively. In the system 1600, the safety platforms 1602*a* and 1602*b* are secured to the same truss 602.

FIG. 16 is a side view, as such all truss brackets 102 of the safety platforms 1602*a*, 1602*b* are secured to their corresponding trusses 602. Once the safety platforms 1602*a*, 1602*b* are secured, the ladder 1604 may be placed on the safety platforms 1602*a*, 1602*b*, e.g., centered between the safety platform 1602*a* and the safety platform 1602*b*. In some cases, this method of use is beneficial for ladders 1604 that have a wider base opening to be freestanding thus increasing user stability and safety.

Figure 17:
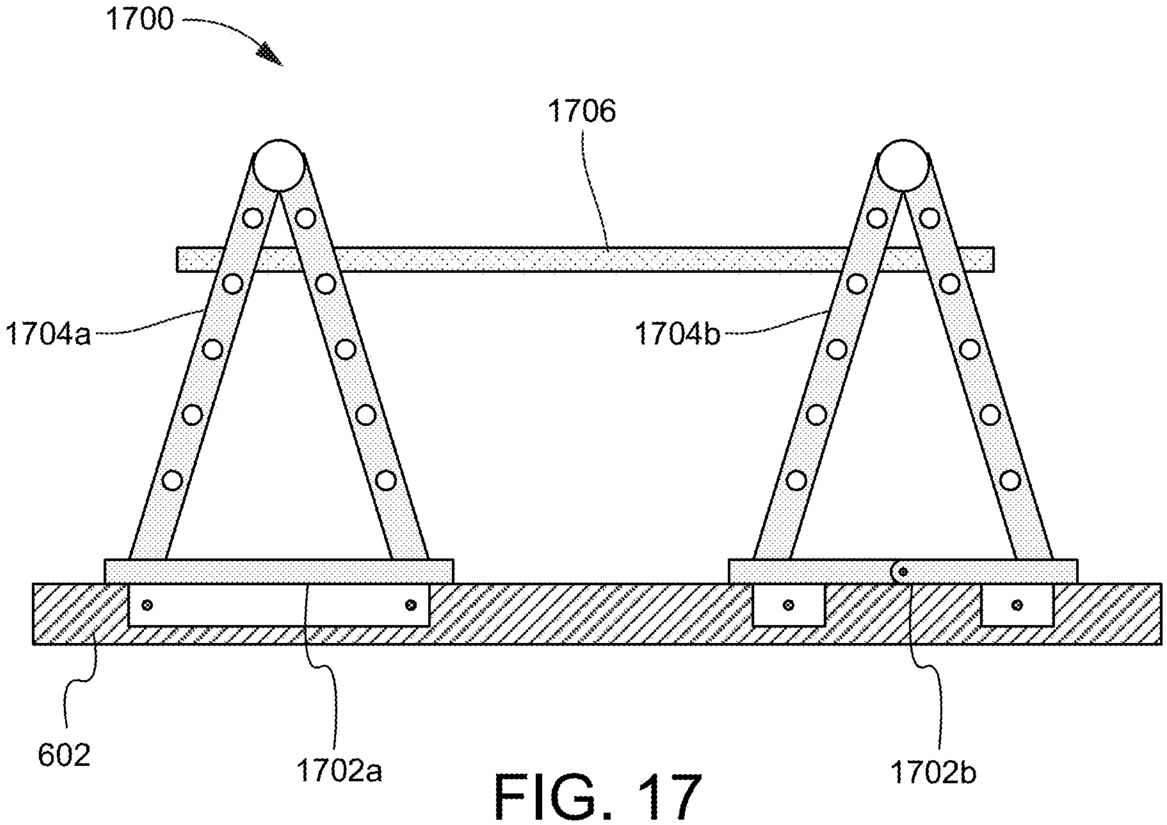
FIG. 17 illustrates one exemplary use of a pair of attic safety platforms in accordance with aspects of the present disclosure.

FIG. 17 illustrates one example of a system 1700 for using multiple safety platforms 1702 to provide a stable platform for multiple ladders 1704, in accordance with aspects of the present disclosure. As shown by FIG. 17, a pair of ladders 1704*a* 1704*b*, respectively, may be supported by two safety platforms 1702*a*, 1702*b*, respectively. In the system 1700, safety platforms 1702*a*, 1702*b* are secured to trusses 602. FIG. 17 is a side view, as such all truss brackets 102 of the safety platforms 1702*a*, 1702*b* are secured to their corresponding trusses 602. Once the safety platforms 1702*a*, 1702*b* are secured, one ladder 1704*a* may be placed atop one safety platform 1702*a* and the other ladder 1704*b* may be placed atop the other safety platform 1702*b*. In some cases, a scaffolding plank 1706 (or similar plank) may be placed on the ladders 1704*a*, 1704*b* (e.g., placed on the steps of the ladders) to form a scaffolding above the trusses 602 (e.g., in the attic space or other environment), thus increasing the utility of the ladders 1704 and the safety platforms 1702. When used as scaffolding, the plank 1706 may be secured to the ladders 1704*a*, 1704*b* to improve safety and stability. Moreover, in certain embodiments, the ladders 1704*a* and/or 1704*b* may be attached to the respective safety platform 1702 to improve safety and stability.

Figure 18:
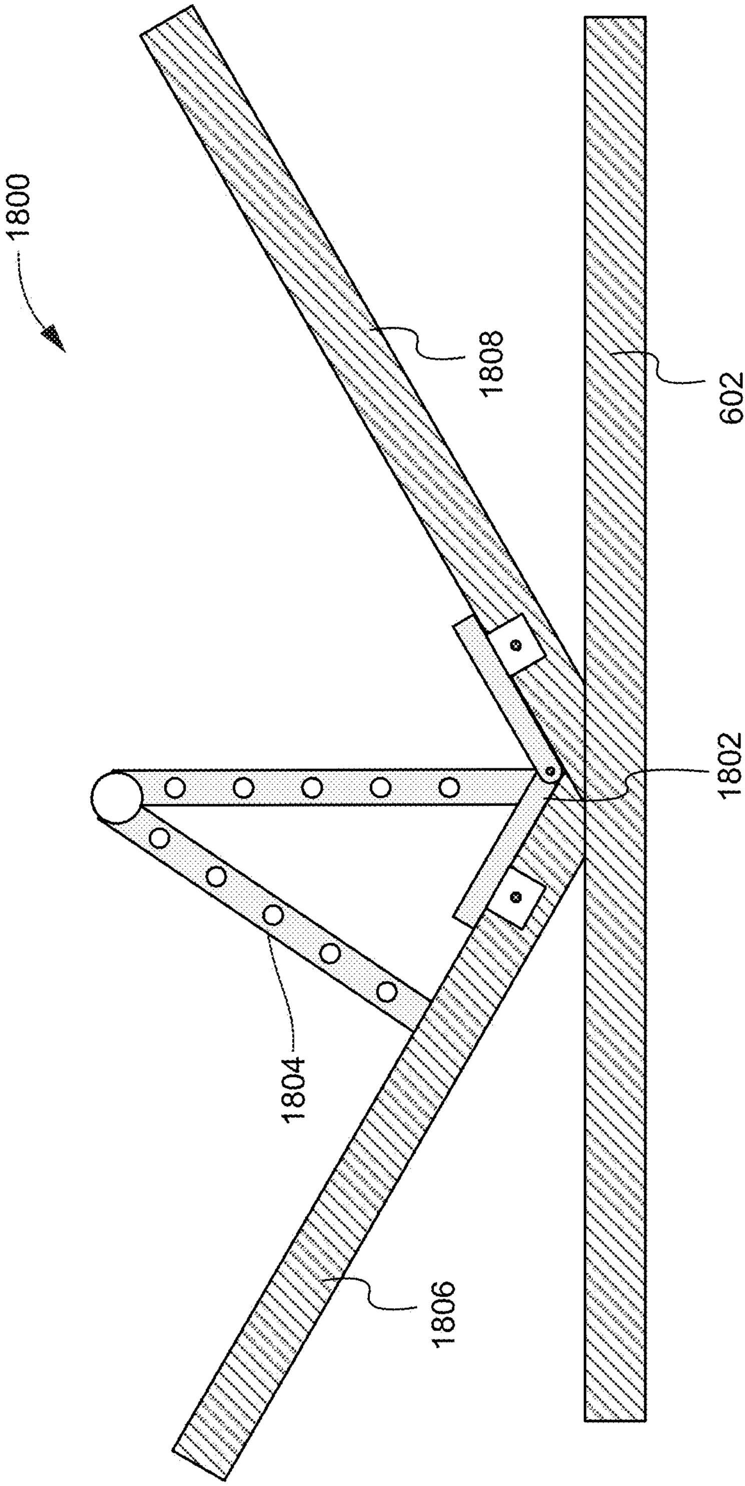
FIG. 18 illustrates another use case of an attic safety platform in accordance with aspects of the present disclosure.

FIG. 18 illustrates one example of a system 1800 for using use of an attic safety platform 1802 to provide a stable platform within an attic space for a ladder 1804, in accordance with aspects of the present disclosure. As shown in FIG. 18, the attic safety platform 1802 includes a hinge and is secured to two angled trusses 1806, 1808, respectively, of an attic, e.g., by truss securement mechanisms 104. In the system 1800, after the attic safety platform 1802 is secured to the trusses 602, one end of the ladder 1804 may be placed in the valley formed by hinge of attic the safety platform 1802. While the other end of the ladder 1804 is depicted as resting on an angled truss 1806, in other embodiments a second attic safety platform (not shown) may be secured to the truss 1806, or the other end of the ladder 1804 may be placed on a second attic safety platform. In certain embodiments, the attic safety platform 1802 may include a lip or ladder securement device to improve the stability of the end of the ladder 1804. Benefits of the attic safety platform 1802 include allowing a user to safely use a ladder 1804 on angled trusses, beams or joists.

Figure 19:
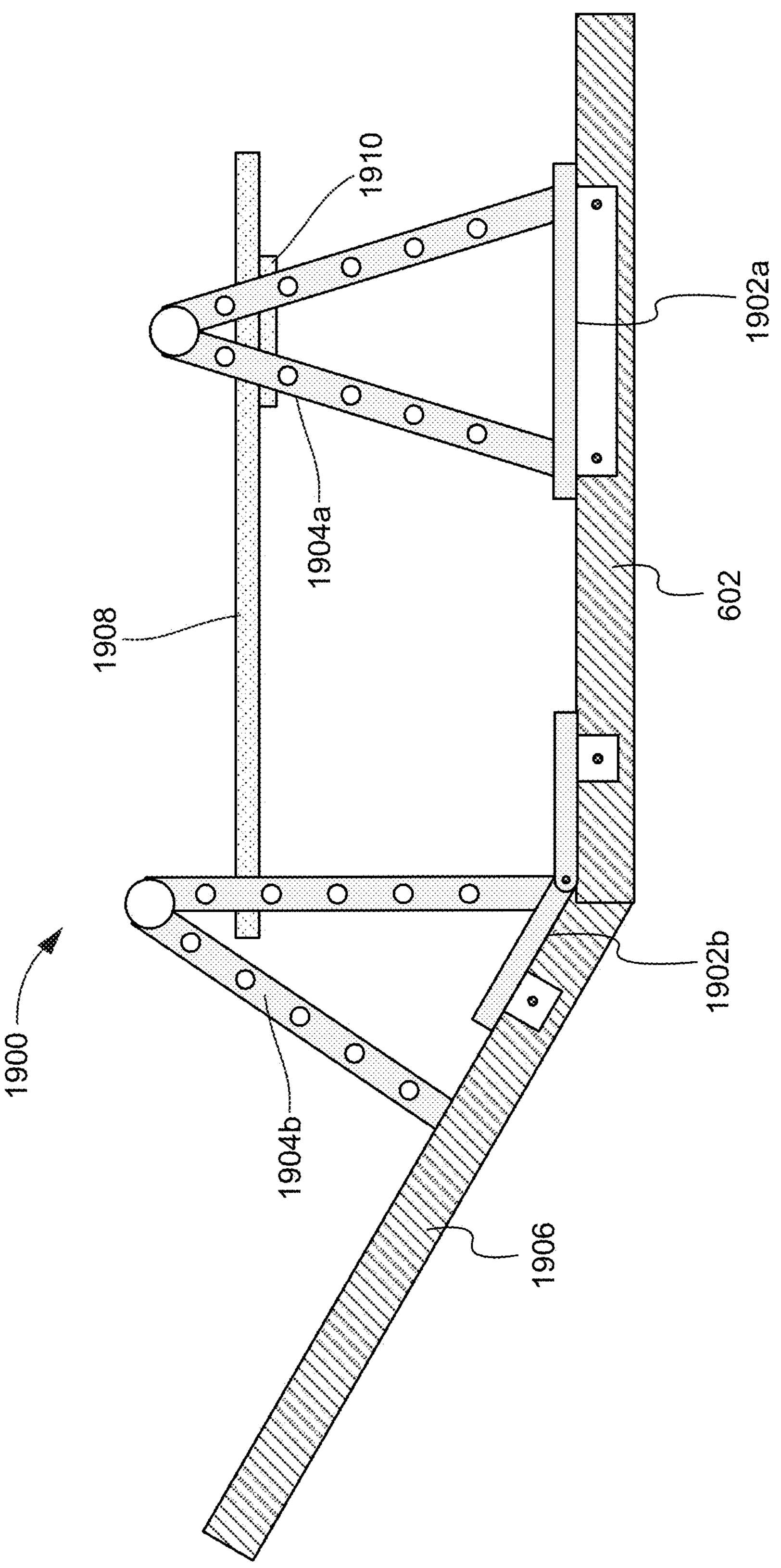
FIG. 19 illustrates another exemplary use of a pair of attic safety platforms in accordance with aspects of the present disclosure.

FIG. 19 illustrates one example of a system 1900 for using use of multiple safety platforms 1902 to provide a stable platform within an attic space for multiple ladders 1904, in accordance with aspects of the present disclosure. As shown by FIG. 19, a pair of ladders 1904*a*, 1904*b*, respectively, may be supported by two safety platforms 1902*a*, 1902*b*, respectively. In the exemplary system 1900, one safety platform 1902*a* is secured to a level truss 602, while the other safety platform 1902*b* is secured to an angled truss 1906. In one embodiment, the safety platform 1902*b* may be a hinged platform attached to both the level truss 602 and the angled truss 1906.

FIG. 19 is a side view, as such all truss brackets 102 of the safety platforms 1902*a*, 1902*b* are secured to their corresponding trusses 602, 1906. Once the safety platforms 1902*a*, 1902*b* are secured, one ladder 1904*b* may be placed in the valley formed by the hinged safety platform 1902*b* and the other ladder 1904*a* may be placed atop the other safety platform 1902*a* (e.g., a hinged or non-hinged platform).

In some cases, a scaffolding plank 1908 (or similar plank) may be placed on the ladders 1904*a*, 1904*b* (e.g., places on the steps of the ladders) to form a scaffolding above the trusses 602 (e.g., in the attic space or other environment), thus increasing the utility of the ladders 1904*a*, 1904*b* and the safety platforms 1902*a*, 1902*b*. When used as scaffolding, the plank 1908 may be secured to the ladders 1904*a*, 1904*b* to improve safety and stability. Because the steps of the ladders 1904*a*, 1904*b* may not be at the same level, in certain embodiments, adapter plank 1910 may be used to shim the plank 1908 so that the scaffolding is substantially level. While an end of the ladder 1904*b* is depicted as resting on the angled truss 1906, in other embodiments a third attic safety platform (not shown) may be secured to the angled truss 1906, as described above.

Though not shown, in some embodiments of use, the safety platforms described herein may be a workstation for a user to hold and maintain various tools to be used, e.g., while in an attic space. For example, a user (e.g., tradesperson) may place a toolbox, stool, or any number of various tools on the safety platform that the user needs, e.g., to complete their project within an attic.

Some advantages of the safety platforms described herein include increased safety, stability, and decreased damage to the building. In some instances, an extension ladder may be able to reach a high working point within an attic, however in order to use the extension ladder a user needs to cut into a homeowner's ceiling to access that point. The safety platforms described herein allow a user to reach the height within the attic without damaging a homeowner's ceiling. Alternatively, the safety platforms described herein may permit a user to access places within an attic that are not accessible by extension ladder, even after removing portions of the ceiling.

Figure 20:
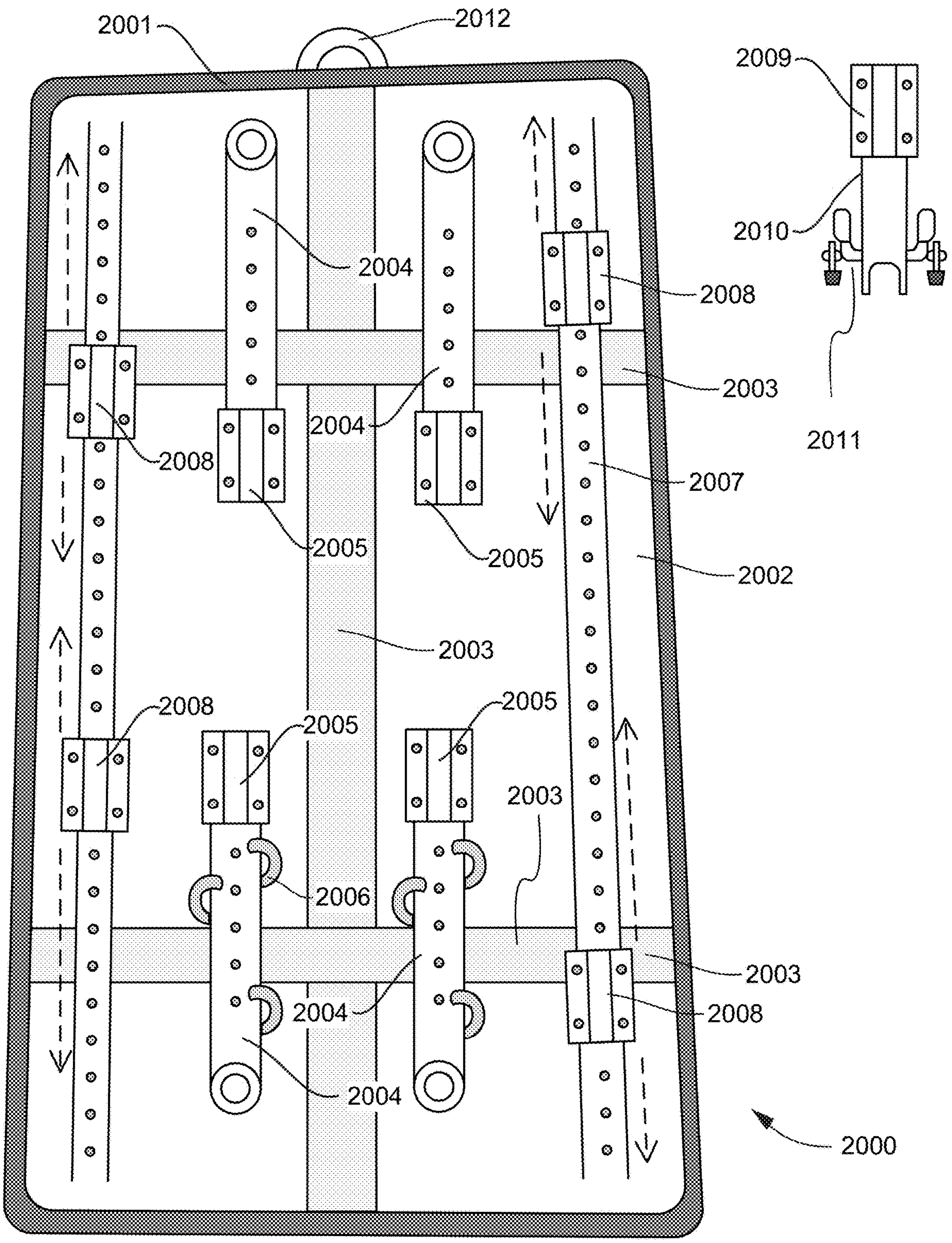
FIG. 20 is a bottom view illustrating another embodiment of an attic safety platform in accordance with aspects of the present disclosure.

FIG. 20 depicts the underside of an exemplary safety platform 2000, in accordance with aspects of the present disclosure. In certain embodiments, the safety platform 2000 may implement, or may be implemented by, a variant of the safety platforms described herein, including the attic safety platform 100, the attic safety platform 200 or the attic safety platform 500, among others described above.

In some embodiments, the safety platform 2000 may include a safety perimeter 2001 that surrounds a base 2002 of the safety platform 2000. The base 2002 may be substantially similar to the platform base 101 described above. The safety perimeter 2001 may be substantially similar to the perimeter 406 described above and may provide structural support and rigidity to the safety platform 2000. In some embodiments, the safety perimeter 2001 may be padded to reduce the risk of injury or damage should the safety platform 2000 collide edge-on with a person or object.

In some embodiments, the safety platform 2000 may include bracing 2003 to provide additional strength and rigidity to the safety platform 2000. The bracing 2003 may be substantially similar to the set of braces 402 described above.

In some embodiments, the safety platform 2000 may include a set of folding legs 2004 attached to the base 2002. In certain embodiments, the set of folding legs 2004 may be attached to the bracing 2003. The set of folding legs 2004 may be substantially similar to the legs 502 described above.

In some embodiments, the safety platform 2000 may include a set of mounting points 2005 for the legs. Each mounting point 2005 may be configured to attach to a corresponding anchoring device 2010, thereby allowing the safety platform 2000 to be removably attached to a truss or joist via a leg 2004.

In some embodiments, the safety platform 2000 may include one or more sets of retaining devices 2006 configured to retain the folding legs 2004 against the base 2002. For ease of illustration, FIG. 20 shows retaining devices 2006 only for the bottom legs 2004. However, it is understood that the safety platform 2000 may also include sets of retaining devices 2006 for the upper legs 2004.

In some embodiments, the safety platform 2000 may include a set of rails 2007, each rail including a set of mounting points 2008. In certain embodiments, the mounting points 2008 may slide upon a respective rail 2007 to be positioned relative to the safety platform 2000. For example, the mounting points 2008 may be positioned near (e.g., above) a truss or joint. Each mounting point 2008 may be configured to attach to a corresponding anchoring device 2010, thereby allowing the safety platform 2000 to be removably attached to a truss or joist.

In some embodiments, the safety platform 2000 may include 2009 a mounting foot 2009 for each anchoring device 2010. In some embodiments, the safety platform 2000 may include a set of anchoring device 2010 configured to attach to a mounting point 2005 and/or mounting point 2008. The anchoring devices 2010 may be substantially similar to the truss securement mechanisms 104, described above. While FIG. 20 shows only a single exemplary anchoring device 2010, one of skill in the art will understand that there may be an anchoring device 2010 for each of the mounting points 2005, 2008, or a subset thereof.

In some embodiments, each anchoring device 2010 may be dimensioned to fit loosely around a truss or joist. Further, each anchoring device 2010 may include one or more quick-release clamps 2011 or similar fastening devices.

In some embodiments, the safety platform 2000 may include a handle 2012. The handle 2012 may be substantially similar to the handle 112 described above. In the depicted embodiment, the handle 2012 may extend away from a narrow end of the rectangular safety platform 2000.

Figure 21:
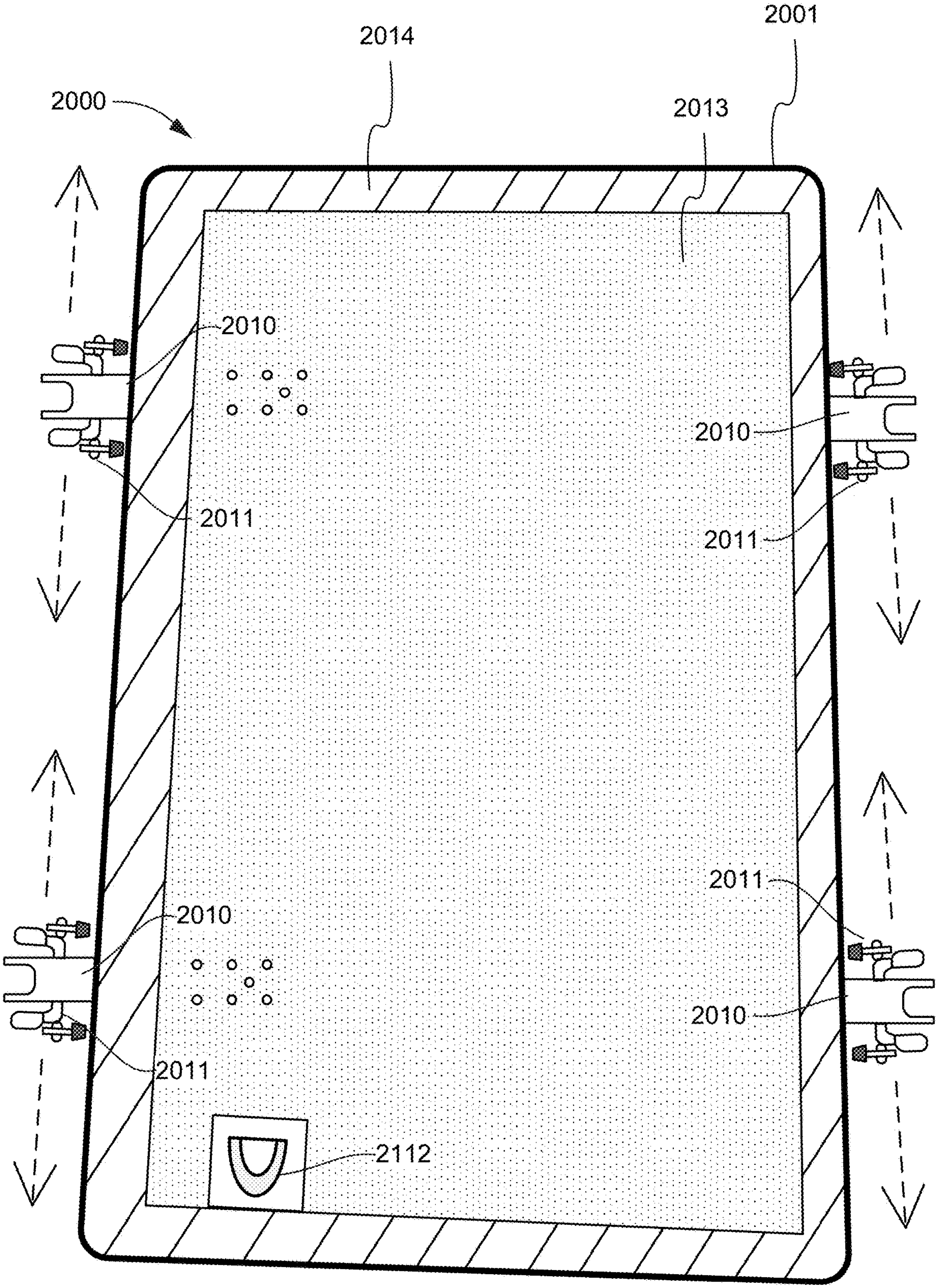
FIG. 21 is a top view illustrating one embodiment of the attic safety platform of FIG. 20.

FIG. 21 depicts an embodiment of the topside of the safety platform 2000, in accordance with aspects of the present disclosure. In some embodiments, the safety platform 2000 may include a top surface 2013 substantially similar to the top layer 106 described above.

In some embodiments, the safety platform 2000 may include a visual border 2014 next to the safety perimeter 2001. In one embodiment, the visual border 2014 may be brightly colored and/or reflective to serve as a safety warning for the platform's edge. For example, the visual border 2014 may be composed of striped yellow and black hazard tape.

FIG. 21 depicts a handle 2112 that is an alternative to the handle 2012. The handle 2112 may be substantially similar to the handle 112 described above. In the depicted embodiment, the handle 2112 may be embedded into the top surface 2013 of the rectangular safety platform 2000.

In the above description, certain terms may be used such as "receiving," "inserting," "attaching," "connecting," and the like. These terms are used, where applicable, to provide some clarity of relationships. But, these terms are not intended to imply absolute relations. Rather, these terms may be interchangeable with one another.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein, a plurality of particular features does not necessarily mean every particular feature of an entire set or class of the particular features.

Additionally, as used herein, "adjacent" does not necessarily denote contact. For example, one element can be adjacent to another element without being in contact with that element.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A safety platform for selectively receiving a ladder having a pair of spaced legs, a pair of feet corresponding to the pair of spaced legs, and a plurality of spaced transversely mounted rungs, the safety platform comprising:

a platform base comprising an upper surface, an opposed bottom surface, and a perimeter;

a raised lip along the perimeter; and a plurality of truss brackets coupled to the opposed bottom surface, wherein each truss bracket comprises:

a base member extending horizontally along the opposed bottom surface;

at least one side member extending downwardly away from the opposed bottom surface; and a truss securement mechanism configured to secure the truss bracket to a truss or a joist, each truss securement mechanism comprising a plurality of spikes or a plurality of teeth attached to an underside of the base member; and wherein the base member and the at least one side member of each truss bracket defines a partially open trough that is configured to receive the truss or joist, and wherein each securement mechanism is configured to secure a corresponding truss bracket to a different truss or joist of a set of trusses or joists.

2. The safety platform of claim 1, wherein the upper surface comprises a sunken area configured to receive the ladder, and wherein at least the sunken area comprises an anti-slip coating.

3. The safety platform of claim 1, wherein the platform base comprises a padded perimeter.

4. The safety platform of claim 1, wherein the plurality of truss brackets is configured to rotate relative to the platform base to adjust the safety platform based on an environment above the one or more trusses or joists.

5. The safety platform of claim 4, wherein the plurality of truss brackets is configured to rotate up to 90 degrees about an axis perpendicular to a plane associated with the platform base.

6. The safety platform of claim 1, wherein one or more truss brackets of the plurality of truss brackets is configured to adjust linearly based on a spacing between the set of trusses or joists.

7. The safety platform of claim 1, wherein the plurality of spikes or the plurality of teeth are formed of metal and extend away from the underside of the base member.

8. The safety platform of claim 1, wherein for each truss bracket of the plurality of truss brackets, the plurality of spikes are interspersed along a length of the truss bracket.

9. The safety platform of claim 1, wherein the plurality of truss brackets comprises a first set of truss brackets spaced apart from each other according to a first spacing, and wherein the plurality of truss brackets further comprises a second set of truss brackets spaced apart from each other according to a second spacing, wherein the first spacing is less than the second spacing.

10. The safety platform of claim 9, wherein the first spacing comprises 16 inches on center, and wherein the second spacing comprises 24 inches on center.

11. The safety platform of claim 9, wherein at least one bracket of the first set of truss brackets also belongs to the second set of truss brackets.

12. A ladder safety system for selectively receiving a ladder having a pair of spaced legs, a pair of feet corresponding to the pair of spaced legs, and a plurality of spaced transversely mounted rungs, the ladder safety system comprising:

a support platform comprising an upper surface, an opposed bottom surface, and a perimeter;

at least two truss brackets coupled to the opposed bottom surface of the support platform, each truss bracket comprising:

a base member extending horizontally along the opposed bottom surface of the support platform;

at least one side member extending downwardly away from the opposed bottom surface of the support platform; and a truss securement mechanism configured to secure the truss bracket to a truss or a joist, each truss securement mechanism comprising a plurality of spikes or a plurality of teeth attached to an underside of the base member, wherein the plurality of spikes or the plurality of teeth are formed of metal and extend away from the underside of the base member, wherein the base member, and the at least one side member of each truss bracket defines a partially open trough that is configured to receive the truss or joist, and wherein each securement mechanism is configured to secure a corresponding truss bracket to a different truss or joist of a set of trusses or joists.

13. The ladder safety system of claim 12, wherein the upper surface of the support platform comprises a sunken area configured to receive the pair of feet, and wherein at least the sunken area comprises an anti-slip coating.

14. The ladder safety system of claim 12, wherein the support platform comprises a padded perimeter.

15. The ladder safety system of claim 12, further comprising a raised lip along the perimeter of the support platform.

16. The ladder safety system of claim 12, wherein for each truss bracket, the plurality of spikes are interspersed along a length of the truss bracket.

17. The ladder safety system of claim 12, wherein the at least two truss brackets comprise a first set of truss brackets spaced apart from each other according to a first spacing, and wherein the at least two truss brackets further comprise a second set of truss brackets spaced apart from each other according to a second spacing, wherein the first spacing is less than the second spacing.

18. The ladder safety system of claim 17, wherein the first spacing comprises 16 inches on center, and wherein the second spacing comprises 24 inches on center.

19. A ladder safety system for selectively receiving a ladder having a pair of spaced legs, a pair of feet corresponding to the pair of spaced legs, and a plurality of spaced transversely mounted rungs, the ladder safety system comprising:

a support platform comprising an upper surface, an opposed bottom surface, and a perimeter, wherein the upper surface of the support platform comprises a sunken area configured to receive the pair of feet, and wherein at least the sunken area comprises an anti-slip coating;

at least two truss brackets coupled to the opposed bottom surface, each truss bracket comprising:

a base member extending horizontally along the opposed bottom surface;

at least one side member extending downwardly away from the opposed bottom surface; and a truss securement mechanism configured to secure the truss bracket to a truss or a joist, each truss securement mechanism comprising a plurality of spikes or a plurality of teeth attached to an underside of the base member, wherein the base member, and the at least one side member of each truss bracket defines a partially open trough that is configured to receive the truss or joist, and wherein each securement mechanism is configured to secure a corresponding truss bracket to a different truss or joist of a set of trusses or a joists.

20. The ladder safety system of claim 19, wherein the plurality of spikes or the plurality of teeth are formed of metal and extend away from the underside of the base member.

* * * * *